United States Patent
Kawakita et al.

(10) Patent No.: US 6,529,802 B1
(45) Date of Patent: Mar. 4, 2003

(54) ROBOT AND INFORMATION PROCESSING SYSTEM

(75) Inventors: Kozo Kawakita, Kanagawa (JP); Tadashi Ohtsuki, Kanagawa (JP); Yoshihiro Kuroki, Kanagawa (JP); Tetsuya Kagami, Chiba (JP); Tatsuzo Ishida, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/719,127
(22) PCT Filed: Jun. 23, 1999
(86) PCT No.: PCT/JP99/03344
§ 371 (c)(1),
(2), (4) Date: Mar. 2, 2001
(87) PCT Pub. No.: WO99/67067
PCT Pub. Date: Dec. 29, 1999

(30) Foreign Application Priority Data

Jun. 23, 1998 (JP) .............................. 10/175618

(51) Int. Cl.[7] .............................. G06F 19/00
(52) U.S. Cl. .............................. 700/245; 700/9; 700/69; 700/79; 700/96; 709/219; 709/220; 709/228; 701/483; 701/118; 345/719; 600/301
(58) Field of Search .............................. 700/245, 9, 69, 700/79, 96; 709/219, 220, 228; 345/719; 600/301, 483; 701/118; 180/168

(56) References Cited

U.S. PATENT DOCUMENTS

| | | | | |
|---|---|---|---|---|
| 4,361,202 A | * | 11/1982 | Minovitch | 180/168 |
| 5,544,297 A | * | 8/1996 | Milne et al. | 707/500.1 |
| 5,553,609 A | * | 9/1996 | Chen et al. | 600/301 |
| 5,787,419 A | * | 7/1998 | Sato et al. | 707/104.1 |
| 5,880,720 A | * | 3/1999 | Iwafune et al. | 725/114 |
| 5,982,362 A | * | 11/1999 | Carter et al. | 327/327 |
| 6,201,996 B1 | * | 3/2001 | Carter et al. | 700/9 |
| 2001/0021882 A1 | * | 9/2001 | Hosonuma | 700/245 |

FOREIGN PATENT DOCUMENTS

| | | | |
|---|---|---|---|
| JP | 6245092 | | 3/1987 |
| JP | 0466857 | | 6/1992 |
| JP | 407102608 | * | 4/1995 |

OTHER PUBLICATIONS

Mizoguchi et al., Human–robot collaboratin in the smart office environment, 1999, IEEE, pp. 79–84.*

Kanai et al., High density pin board matrix switches for automated MDF system, 1992, IEEE, pp. 893–903.*

Berger et al., Asymmetric data communicaitn using DECT in an industrial environment, 1997, IEEE, pp. 2099–2102.*

Kitagishi et al., Human intention monitoring system in cyber robotics, (Initial report; Concept and construction), 1999, IEEE, pp. 67–72.*

Ouchi et al., Handshake telephone system to communication with voice adn force, 1997, IEEE, pp. 466–471.*

21st Annual Electronics and Aerospace Conference, How will space and terrestIrial system share the Future? Nov. 9–11, 1988, 1998, IEEE, p. 1.*

(List continued on next page.)

*Primary Examiner*—William A. Cuchlinski, Jr.
*Assistant Examiner*—McDieunel Marc
(74) *Attorney, Agent, or Firm*—Jay H. Maioli

(57) ABSTRACT

A robot provides a communicating means to move based on the transmission and reception of information to/from the outside, thereby making it possible to realize a robot with high usability. In addition, it recognizes the user's condition based on sensors provided around a user and outputs a response message according to the recognition. Thus, an information processing system which is very helpful can be realized.

11 Claims, 26 Drawing Sheets

OTHER PUBLICATIONS

Ouchi et al., Handshake telephone system to communcation system to communication with voice and force, 1997, IEEE, pp. 466–471.*

21$^{st}$ Annual electronics and aerospace conference, How will space and terrestrial system share the future?, 1988, IEEE, p. 1 Sony and AIBO, 2000.*

Tashima et al. Interactive pet robot with emotion model, 1998, pp. 11–12.*

Fujita et al., Reconfigurable physical agents, 1998, pp. 54–61.*

Fujita et al., Robot enertainment, 1996, pp. 234–239.*

Adam, History of robotic, 1921–, Internet, pp. 1–10.*

* cited by examiner

| LIGHT IN THE ROOM | ON | ON | ON | OFF |
| --- | --- | --- | --- | --- |
| TV | ON | OFF | ON | OFF |
| LIGHT IN THE KITCHEN | OFF | ON | ON | OFF |
| FAUCET IN THE KITCHEN | OFF | OFF | ON | OFF |
| CHANGE OF WATER LEVEL OF THE BATH TUB | NO CHANGE | CHANGE | OFF | OFF |
| GAS IN THE BATHROOM | OFF | ON | OFF | OFF |
| LIGHT IN THE BATHROOM | OFF | ON | OFF | OFF |
| USER'S CONDITION | WATCHING TV | IN THE BATHROOM | IN THE KITCHEN | SLEEPING |

FIG. 13

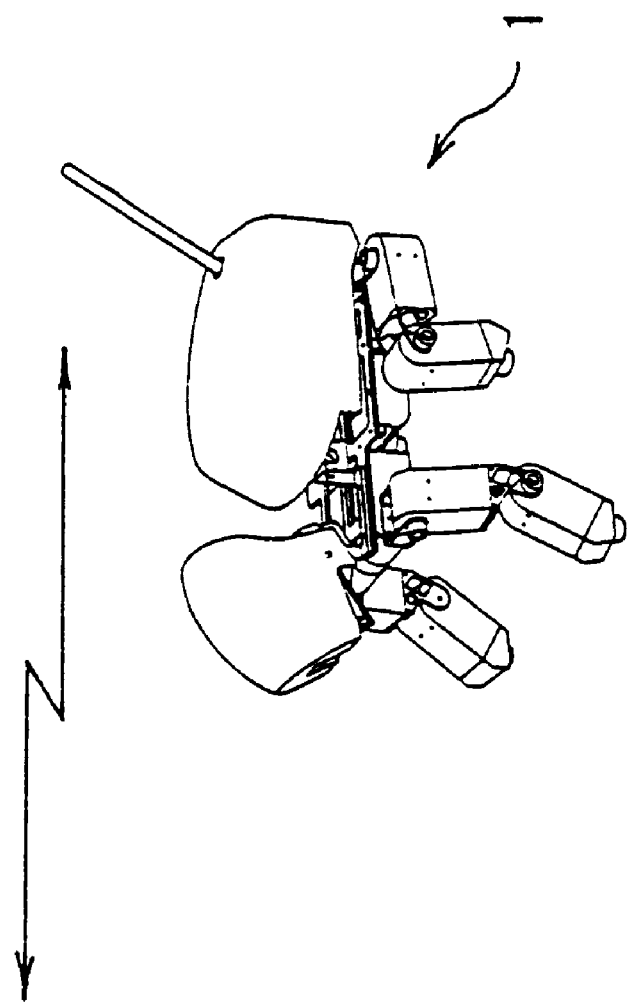
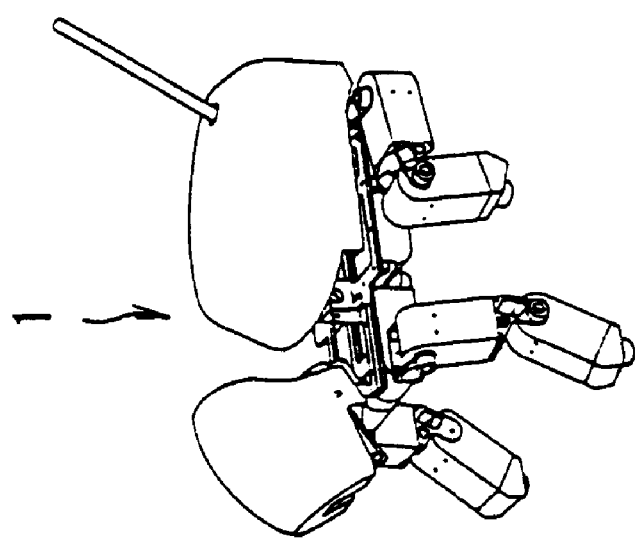
FIG. 23

ROBOT AND INFORMATION PROCESSING SYSTEM

TECHNICAL FIELD

This invention is related to a robot and an information processing system, and for example, is suitably applied to an entertainment robot treated as a pet.

BACKGROUND ART

Recently, information communication technology using information transmission lines, such as a telephone line for public telephones, mobile telephones and the like, Internet, and communication satellite circuits has been significantly improved in order to surely transmit various kinds of information via images and sounds at real time.

However, such the current information communication technology that can deal with only images and sounds has a problem that it lacks reality in the case where a user transmits his feelings to a communicating party, for example.

Besides, in recent years, development and production of robots has been prosperous in addition to the data communication technology. For example, an amusement robot treated as a pet has been considered, which looks like a dog, a cat or the like and can automatically act according to the surrounding situations.

Such the amusement robot, however, merely acts similarly to a dog or a cat, and can not act, for example, so as to be very helpful for a user, other than amusements.

For example, if such a amusement robot has a communicating function for communicating with the outside through various kinds of transmission lines, such as a telephone line, Internet, and communication satellite circuits, a user can visually transmit his feelings to the amusement robot via movements using the communicating function and can make the robot act so as to be very helpful for himself, so that it will be possible to improve the value of utilizing an amusement robot.

DISCLOSURE OF INVENTION

The present invention has been made in view of the aforementioned problems, and is intended to provide a robot and an information processing system that are valuable in use.

In order to solve the aforementioned problems, the present invention provides a robot comprising a movement part for produce movements, an actuator for driving the movement part, an actuator control means for controlling the actuator, a communicating means for receiving signals used between the robot and another electronic device, and an information detecting means for detecting information from signals received by the communicating means. The actuator control means controls the actuator based on the information detected by the information detecting means, to make the movement part produce stated movements, thereby it is possible to improve the value of the robot in use.

Further, in the present invention, the robot comprises a memory means for memorizing stated information, a memorized content changing means for changing the memorized content memorized in the memory means, a communicating means for receiving signals used between the robot and another electronic device, and a request detecting means for detecting an information updating request which indicates the update of stated information from the signals received by the communicating means. The memorized content changing means updates stated information based on the information updating request, which is detected by the request detecting means, thereby it is possible to improve the value of the robot in use.

Further, in the present invention, the robot has an output-of-sensor receiving means for receiving outputs from one or more sensor(s) provided in a user himself or near the user, a user's condition recognizing means for recognizing the user's condition based on the outputs of the sensor(s) received by the output-of-sensor receiving means, a movement part for producing stated movements, an actuator for driving the movement part, an actuator control means for controlling the actuator, and a telephone communicating means for receiving signals used between the robot and another electronic device. When the telephone communicating means receives a communication signal from another electronic device, if the phone call is not answered within a fixed time, the actuator control means makes the movement part produce stated movements based on the user's condition recognized by the user's condition recognizing means, thereby it is possible to improve the value of the robot in use.

Furthermore, in the present invention, an information processing system comprises one or more sensor(s) provided in the user himself or near the user, a user's condition recognizing means for recognizing user's conditions based on outputs of the sensor(s), a response message memory means for memorizing response messages according to the user's conditions, and a response message output means for outputting a response message. When a phone call is not answered within a fixed time, the response-message output means outputs a response message based on the user's conditions, which are recognized by the user's condition recognizing means, thereby it is possible to improve the value of the robot in use.

Furthermore, the present invention provides the robot comprising a movement part for producing movements, an actuator for driving the movement part, an actuator control means for controlling the actuator, a communicating means for transmitting signals used between the robot and another electronic device, an information input means for inputting information from the outside, and an information output means for outputting information to the outside. The actuator control means controls the actuator based on the information, which is input to the information input means, to make the movement part produce stated movements, and the information output means outputs the stated information from the communicating means to another electronic device based on the information, which is input to the information input means, thereby it is possible to improve the value of the robot in use.

Furthermore, the present invention provides the robot comprising a sensor means for inputting information from a user, a movement part for producing movements, an actuator for driving the movement part, an actuator control means for controlling the actuator, an information output means for outputting stated information, and a communicating means for transmitting signals used between the robot and another electronic device. When an input is not reached from a user within a fixed time, the actuator control means makes the movement part produce stated movements. After producing the stated movements, when the input is not reached yet from the user within a fixed time, the communicating means transmits stated information output from the information output means to another electronic device, thereby it is possible to improve the value of the robot in use.

Furthermore, the present invention provides the robot comprising a movement part for producing movements, an actuator for driving the movement part, an actuator control means for controlling the actuator, a signal receiving means for receiving signals used between the robot and another electronic device, an electronic device control means for controlling another electronic device, and an information detecting means for detecting stated information from the signals received by the signal receiving means. The actuator control means controls the actuator based on the stated information detected by the information detecting means to make the movement part produce stated movements, and the electronic device control means controls another electronic device based on the stated information detected by the information detecting means, thereby it is possible to improve the value of the robot in use.

BRIEF DESCRIPTION OF THE DRAWINGS

FIG. 13 is a schematic diagram used for explaining the answering telephone function.

FIG. 23 is a schematic diagram used for an inter-robot communicating function.

BEST MODE FOR CARRYING OUT THE INVENTION

An embodiment of the present invention will hereinafter be described with reference to the drawings.

(1) Structure of robot according to this embodiment

Figure 1:
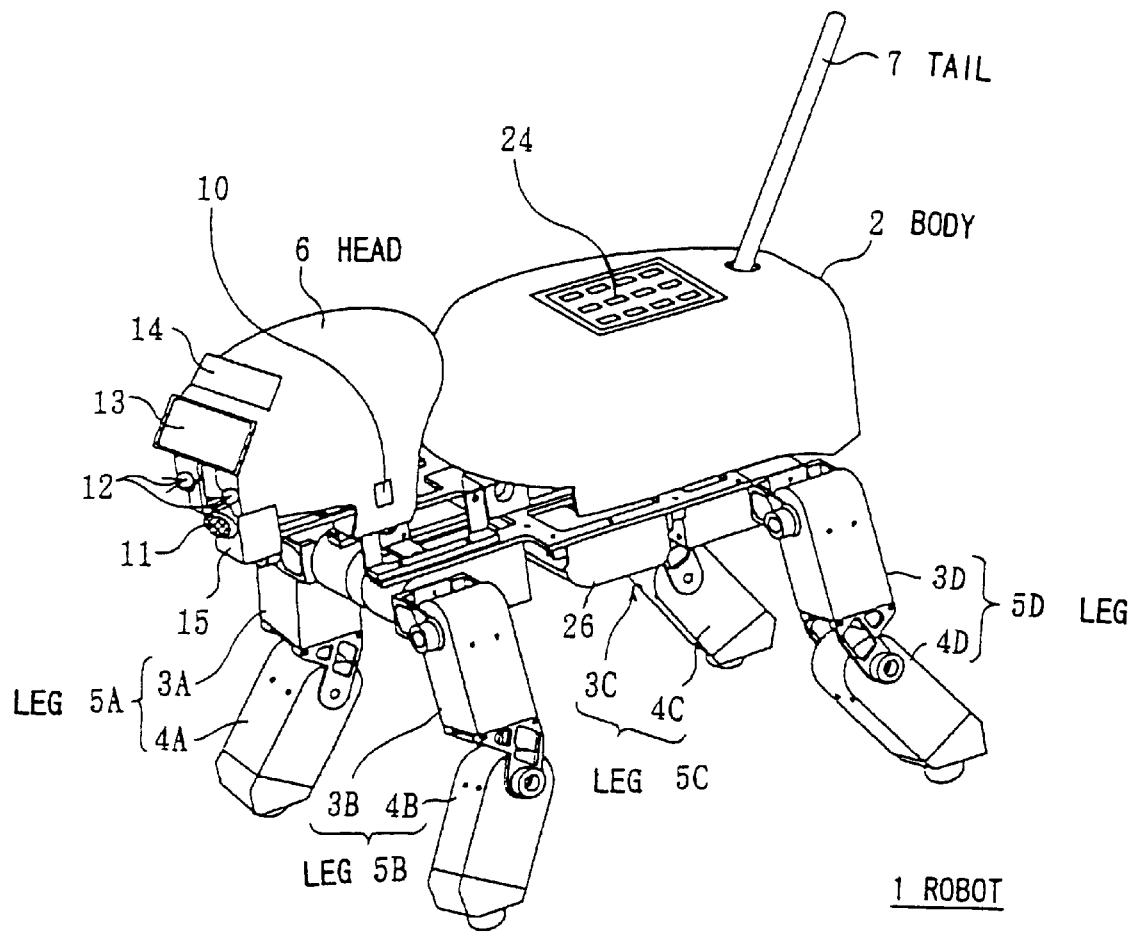
FIG. 1 is a perspective view showing the structure of a robot according to the present invention.

In FIG. 1, numeral 1 shows a robot according to this embodiment as a whole. Legs 5A to 5D comprising the upper halves of the legs 3A to 3D and the lower halves of the legs 4A to 4D are connected to the front-right, front-left, back-right and back-left sides of a body 2, respectively. In addition, a tail 7 is connected to the back of the body 2, projecting upwards.

Figure 2:
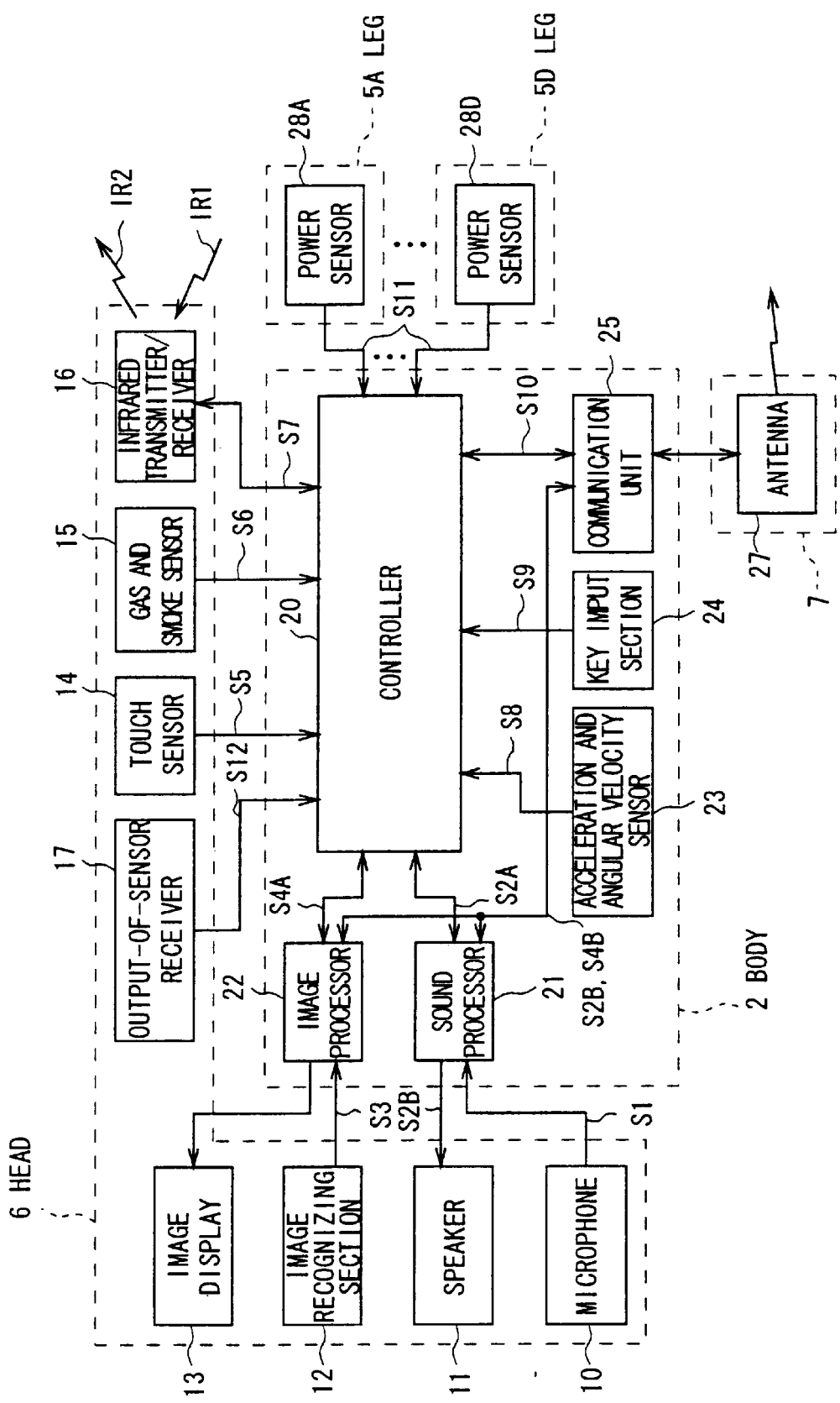
FIG. 2 is a block diagram showing the circuit structure of the robot shown in FIG. 1.

In this case, as shown in FIG. 2, a head 6 is comprised of a microphone 10, a speaker 11, image recognizing section 12 being a CCD (Charge Coupled Device) camera, an image display 13 being a liquid display panel, a touch sensor 14 for detecting pressure given by the outside and contact with the outside, a gas and smoke sensor for detecting leaking of gas and fire, an infrared transmitter/receiver 16 for transmitting and receiving infrared signals IR1, IR2, and an output-of-sensor receiver 17 being a radio receiver or the like.

Further, the body 2 is comprised of a controller 20 in the form of a microcomputer including a CPU (Central Processing Unit), a ROM (Read Only Memory), and a RAM (Random Access Memory), a sound processor 21 having a synchronized-sound producing function and a sound recognizing function, an image processor 22 having an image producing function, an acceleration and angular velocity sensor 23 for detecting the posture and position of the robot 1, a key input section 24 being a keyboard having plural keys as shown in FIG. 1 for inputting code numbers of requests desired by a user, and a communication unit 25 for making the controller 20 communicate with the outside through a telephone line or a circuit for Internet, or by radio or infrared signals. In addition, a battery 26 (FIG. 1) is attached to the stomach of the body 2 as a power source of this robot 1.

On the other hand, the tail 7 has an antenna 27 electrically connected to the communication unit 25 of the body 2. And, a plurality of power sensors 28A to 28D for detecting pressure given from the outside are attached to the legs 5A to 5D, respectively.

In addition, the joints in the legs 5A–5D (the joints between the upper halves of the legs 3A–3D and the lower halves of the legs 4A–4D), the joints between each leg 5A–5D and the body 2, the joint between the head 6 and the body 2, and a joint between the tail 7 and the body 6 each has a joint mechanism constructed as described below.

The microphone 10 of the head 6 gathers words given by the user and outside sounds like music and sounds, and transmits the obtained gathered-sound signal S1 to the sound processor 21. The sound processor 21 recognizes the meanings of the words, which are gathered through the microphone 10, and of the words, which are transmitted from the outside through the telephone line, based on the gathered-sound signal S1 supplied from the microphone 10 and sound information supplied from the communication unit 25 as described later, and transmits the recognition result to the controller 20 and the communication unit 25 as a sound recognition signal S2A. Further, the sound processor 21 generates a synchronized sound under the control of the controller 20 and transmits this to the speaker 11 and the communication unit 25 as a sound signal S2B.

The image recognizing section 12 photographs the surroundings, and transmits the obtained photograph signal S3 to the image processor 22. The image processor 22 recognizes the outside situation photographed by the image recognizing section 12 and images transmitted through the telephone line or the like from the outside, based on the photograph signal S4A supplied from the image recognizing section 12 and the image information supplied from the communication unit 25 as described below, and transmits the recognition result to the controller 20 as an image recognition signal S4A. In addition, the image processor 22 performs predetermined signal processing on the photograph signal S3 from the image recognizing section 12 under the control of the controller 20, and transmits the obtained image signal S4B to the communication unit 25.

The touch sensor 14 detects physical works like "touching" and "patting" from the user and pressure received when the head 6 contacts to an outside thing, and transmits the detection result to the controller 20 as a pressure detection signal S5.

The gas and smoke sensor 15 always checks the concentration of surrounding gas and the concentration of surrounding smoke, and when detecting gas or smoke of which concentration is more than a prescribed value, transmits to the controller 20 a gas and smoke detection signal S6 informing of this situation.

The infrared transmitter/receiver 16 receives the infrared signal RI1 supplied from the user via the infrared remote controller as a control signal, and transmits the reception result to the controller 20 as an infrared reception signal S7.

The output-of-sensor receiver 17 receives an output of sensor transmitted various sensors by radio which are installed in a house for detecting the user's living condition, such as the condition of electricity in the room (ON/OFF), whether the faucet is turned on in the kitchen, and whether gas is opened in the bathroom. Then, it transmits the reception result as an output-of-sensor reception signal S12 to the controller 20.

And, the acceleration and angular velocity sensor 23 of the body 2 detects the acceleration and angular velocity of the time when the robot 1 changes its posture or when the robot 1 moves. Then it transmits the detection result to the controller 20 as an acceleration and angular velocity detection signal S8.

The key input section 24 recognizes the command based on the code number inputted by the user, and transmits the recognition result to the controller 20 as a key input signal S9.

The communication unit 25, under the control of the controller 20, communicates with the outside via the antenna 27 through the telephone line or a circuit for Internet, or by radio for infrared signals, to transmits the obtained image information to the image processor 22 and also transmits sound information for voice, music or the like to the sound processor 21. In addition, it transmits information such as commands and text data from the outside to the controller 20 as a received information signal S10.

Further, the power sensors 28A–28D of the legs 5A–5D each detects the magnitude of power given by the user, and transmits the detection result to the controller 20 as a power detection signal S11.

Based on the sound recognition signal S2A, the image recognition signal S4A, the pressure detection signal S5, the gas and smoke detection signal S6, the infrared reception signal S7, the output-of-sensor reception signal S12, the acceleration and angular velocity detection signal S8, the key input signal S9, the received information signal S10 and the power detection signal S11 respectively supplied from the sound processor 21, the image processor 22, the touch sensor 14, the gas and smoke sensor 15, the infrared transmitter/receiver 16, the output-of-sensor receiver 17, the acceleration and angular velocity sensor 23, the key input section 24, the communication unit 25, and the power sensors 28A–28D, the controller 20 judges the surrounding situation, presence or absence of works by the user, the presence or absence of abnormality, the presence or absence of commands from the user or the outside, the user's living condition, and its own posture and position.

And, the controller 20 decides its own next movement based on this judgment and the control program previously stored in an internal memory not shown, and makes the head 6 move upward and downward, makes the tail 7 wag back and fourth, makes the legs 5A to 5D move to walk, or the like by moving necessary joint mechanisms based on the decision.

Further, the controller 20 controls the sound processor 21, the image processor 22, or/and the infrared receiver 16 as required, to give sounds based on the sound information received from the communicating party via the communication unit 25 and synchronized sounds generated by the sound processor 21, from the speaker 11, to display images based on the image information received from the communicating party via the communication unit 25 and images generated by the image processor, on the image display 13, or to emit the infrared signal IR2 for controlling outside devices to the infrared receiver 16.

In addition, the controller 20 controls the communication unit 25 as required, to transmit sound information based on the sound signal S2B from the sound processor 21, the image information based on the image signal S4B from the image processor 22, and the command information generated by the controller 20 itself in accordance with the manipulation of the outside, to the communicating party.

In this way, the robot 1, based on the its surrounding situations and the commands or the like from the user or the communicating party, can act in accordance with situations and commands.

Note that, in the case of this embodiment, the communication unit 25 is composed of any of communicating devices such as a telephone modem, a handyphone of a cordless telephone, a mobile telephone, a transmitter/receiver for radio waves or a transmitter/receiver for infrared signals, and is exchangeable together with the antenna 27.

Therefore, this robot 1 selects a communication state desired by the user from various kinds of communication states such as a telephone, an Internet, a radio signal, and an infrared signal, to communicate with outside in the selected communication state.

Next, the concrete structures of the joint mechanisms of the joints in the legs 5A–5D, the joints between each leg 5A–5D and the body 2, the joint between the head 6 and the body 2, and the joint between the tail 7 and the body 6 will be described in reference with FIGS. 3 and 4.

Figure 3:
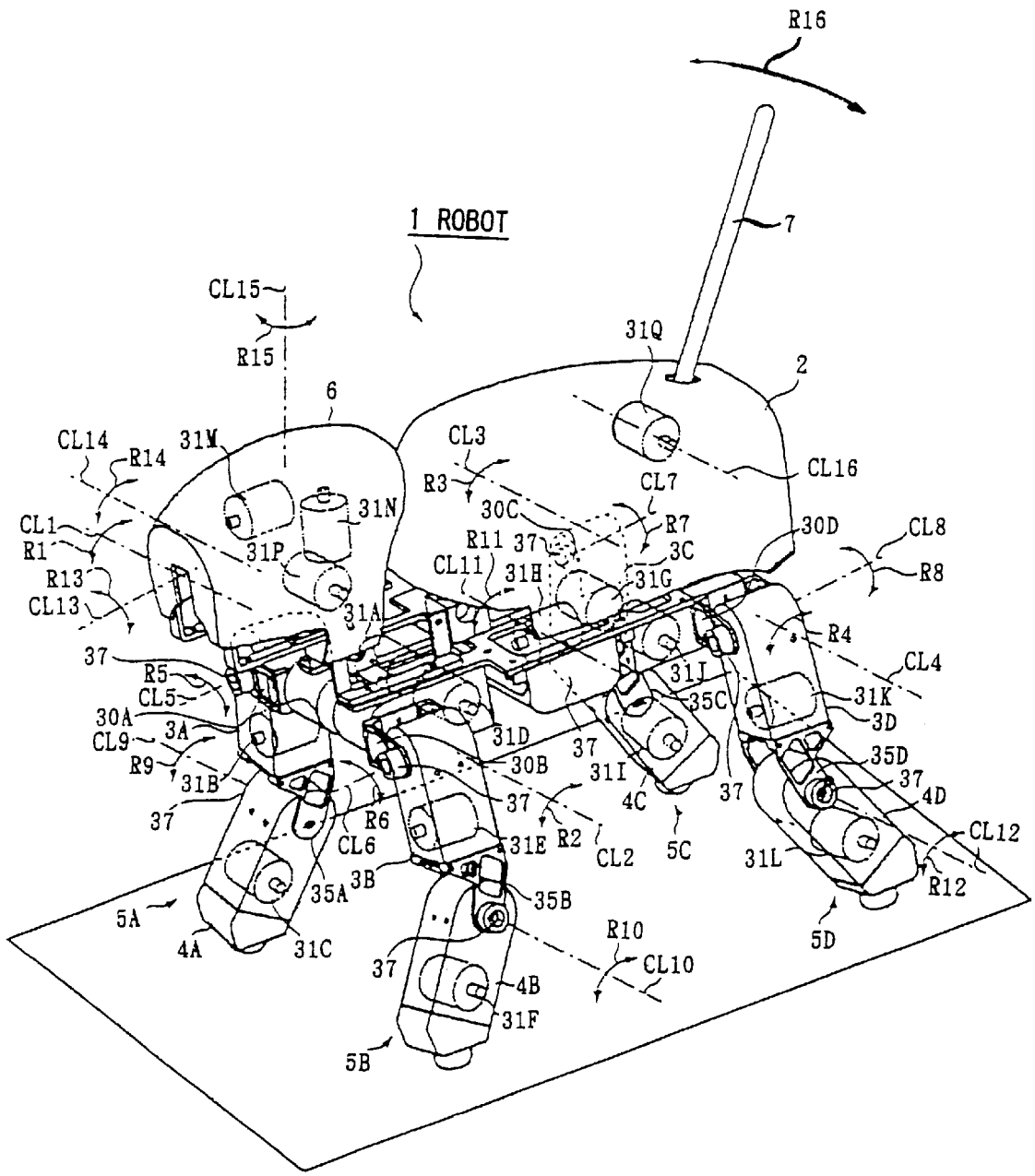
FIG. 3 is a perspective view showing the mechanism of joints of the robot shown in FIG. 1.
Figure 4:
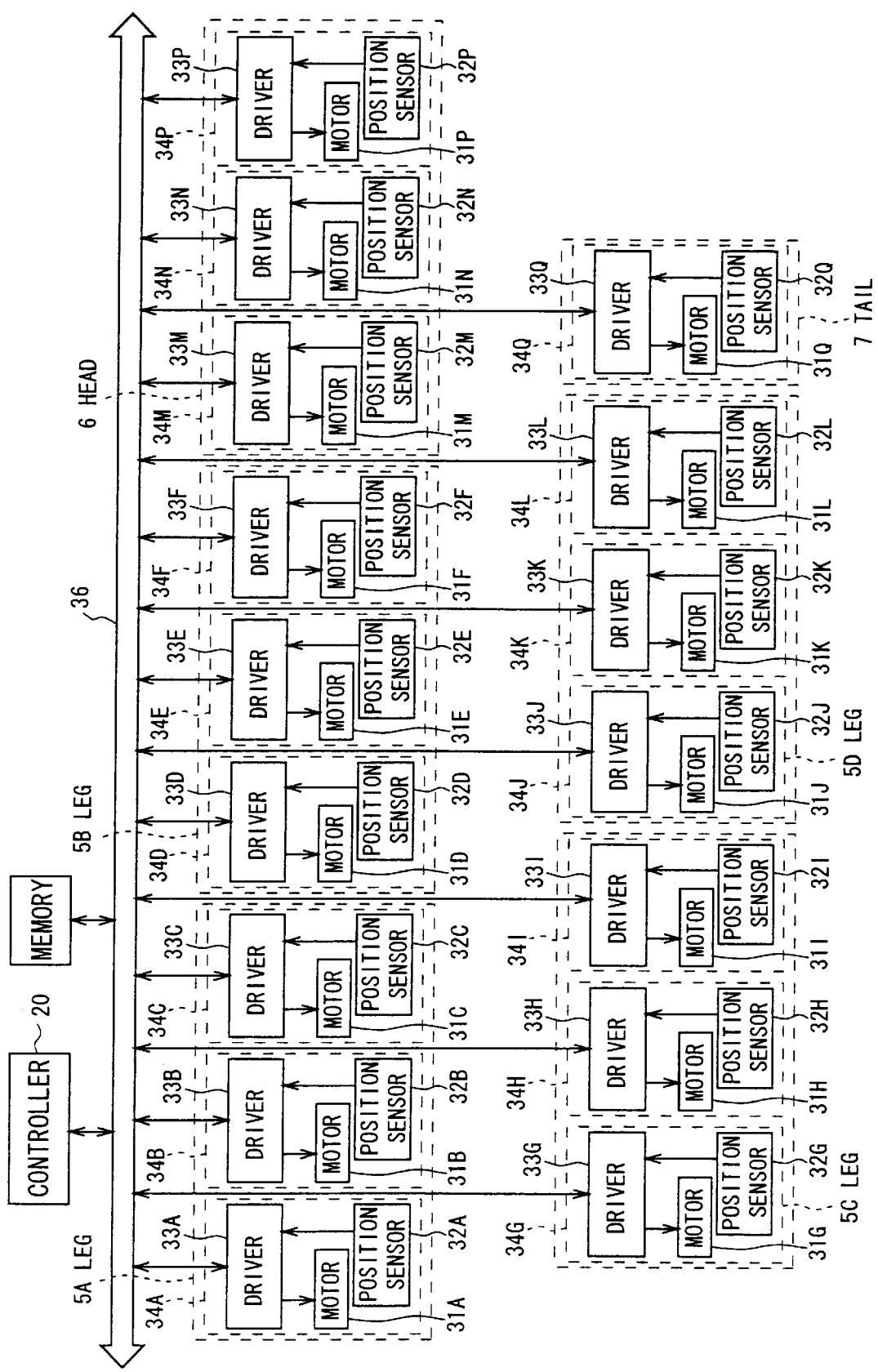
FIG. 4 is a block diagram showing the circuit structure of the joints of the robot shown in FIG. 3.

As can be seen from FIGS. 3 and 4, the joint mechanism between the body 2 and each leg 5A–5D is composed of a bracket 30A–30D provided on the body 2 as shown in FIG. 3, and two pairs of actuators 34A, 34B, 34D, 34E, 34G, 34H, 34J, 34K each one having a motor 31A, 31B, 31D, 31E, 31G, 31H, 31J, 31K, a position sensor 32A, 32B, 32D, 32E, 32G, 32H, 32J, 32K, and a driver 33A, 33B, 33D, 33E, 33G, 33H, 33J, 33K.

The upper ends of the upper halves of the legs 3A–3D of the legs 5A–5D are attached to the respective brackets 30A–30D in the joint mechanisms. The motors 31A, 31D,

31G, 31J in one of the respective two actuators 34A, 34D, 34G, 34J are driven so as to rotate the upper halves of the legs 3A–3D together with the brackets 31A–30D in the directions shown by arrows R1–R4 with central axes CL1–CL4 as a center, respectively. On the other hand, the motors 31B, 31E, 31H, 31K in the other actuators 34B, 34E, 34H, 34K are driven so as to rotate the upper halves of the legs 3A–3D in the directions shown by arrows R5–R8 with central axes CL5–CL8 as a center, respectively.

Further, the joint mechanisms consisting the joints in the legs 5A–5D (every joint between the upper half of the leg 3A–3D and the lower half of the leg 4A–4D) each is composed of a connector 35A–35D attached to the lower end of the upper half of the leg 3A–3D and an actuator 34C, 34F, 34I, 34L having a motor 31C, 31F, 31I, 31L, a position sensor 32C, 32F, 32I, 32L, and a driver 33C, 33F, 33I, 33L.

In addition, the upper ends of the lower halves of the legs 4A–4D are attached to the respective connectors 35A–35D of the joint mechanisms. The motors 31C, 31F, 31I, 31L of the corresponding actuators 34C, 34F, 34I, 34L are driven to rotate the lower halves of the legs 4A–4D in the directions shown by arrows R9–R12 with central axes CL9–CL12 as a center.

Further, the joint mechanism connecting the head 6 and the body 2 is composed of three pairs of actuators 34M, 34N, 34P each having a motor 31M, 31N, 31P, a position sensor 32M, 32N, 32P, and a driver 33M, 33N, 33P.

And, the head 6 is attached to the bracket in this joint mechanism. The motor 31M of the first actuator 34M is driven so as to make the head 6 shake in the direction of an arrow R13 with a central axis CL13 as a center. The motor 31N of the second actuator 34N is rotated so as to make the head 6 shake in the direction of an arrow R14 with a central axis CL14 as a center. The third actuator 34P is driven so as to make the head 6 shake in the direction of an arrow R15 with a central axis CL15 as a center.

Furthermore, the joint mechanism connecting the body 2 and the tail 7 is composed of a bracket (not shown) attached to the connecting position of tail 7 and the body 2, and an actuator 34Q comprising a motor 31Q, a position sensor 32Q, and a driver 33Q.

Besides, the lower end of the tail 7 is attached to the bracket of this joint mechanism. The motor 31Q of the actuator 34Q is driven so as to make the tail 7 wag in the direction of an arrow R16 with the central axis CL16 as a center.

In these joint mechanisms, each of the drivers 33A–33Q of the actuators 34A–34Q is connected to the controller 20 with a bus 36 as shown in FIG. 4, and the motor 31A–31Q and the position sensor 32A–32Q are connected to the corresponding driver 33A–33Q.

Therefore, in this robot 1, the motors 31A–31Q desired by the controller 20 can be controlled through the corresponding drivers 33A–34Q, and the rotary amounts of the motors 31A–31Q which are detected by the corresponding position sensors 32A–32Q at this time can be recognized through the drivers 33A–34Q, thereby making it possible to rotate each motor 31A–31Q by a desired angle with accuracy.

Note that, in this embodiment, the joint mechanisms in the legs 5A–5D (every joint between the upper half of the leg 3A–3D and the lower half of the leg 4A–4D) and the joint mechanisms between each of the legs 5A–5D and the body 2 each has a brake mechanism 37. And using the function of this brake mechanism, this robot 1 can be directly taught a relative position relation of an arbitrary upper half of the leg 3A–3D and lower half of the leg 4A–4D in the legs 5A–5D by a manipulator with the directly teaching method.

(2) Each function of the Robot 1

Next, each function of the robot 1 will be described.

Figure 5:
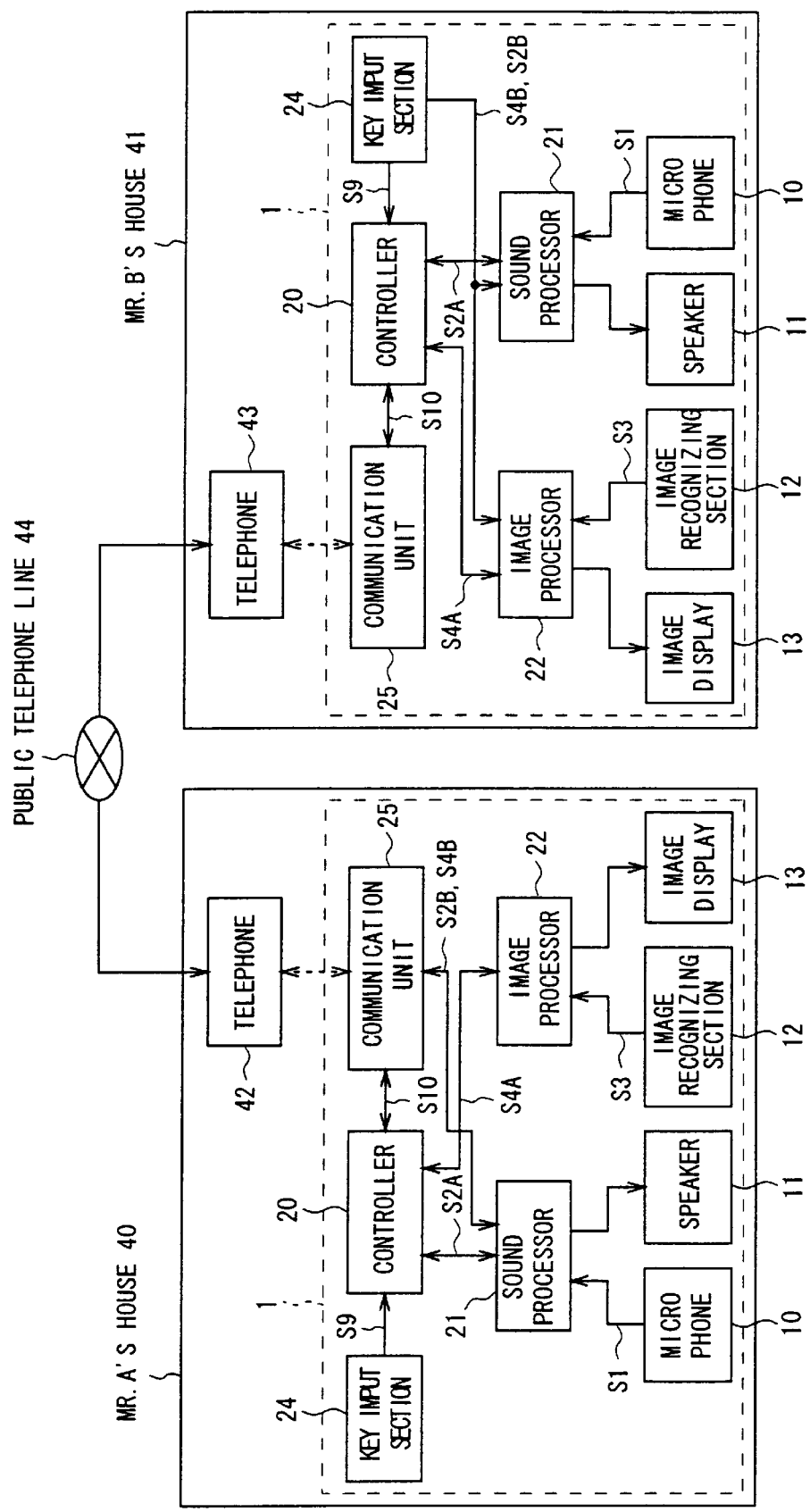
FIG. 5 is a block diagram used for explaining a telephone function of the robot.

Note that, as described above, the communication unit 25 of this robot 1 is exchangeable and can communicate with the outside in a communication state desired by a user. In the following explanation, as shown in FIG. 5 as one example, handyphones of a cordless telephone are applied as the communication unit 25 of the robot 1 in Mr. A's house 40 and the communication unit 25 of the robot 1 in Mr. B's house 41, and Mr. A's robot 1 and Mr. B's robot 1 can communicate through the telephone line via the telephones 42, 43, respectively.

(2-1) Robot telephone function

Firstly, this robot 1 has a robot telephone function so that users can communicate with each other using another one robot, which is the same as the robot 1, with further reality as compared with communications on the phone.

For example, when Mr. A manipulates the key input section 24 of Mr. A's robot 1 to input a prescribed first code number and the telephone number of Mr. B for making a phone call, the controller 20 of Mr. A's robot 1 controls the communication unit 25 to call Mr. B's robot 1.

Then, when the controller 20 of Mr. B's robot 1 knows the phone call from the outside via the communication unit 25, it controls the sound processor 21 to give sounds from the speaker 11 for informing of this phone call.

Then, when the controller 20 of Mr. A's robot 1 confirms that Mr. B answers this call by manipulating Mr. B's robot 1, it controls the communication unit 25 to transmit image information on an image of Mr. A photographed by the image recognizing section 12, which is obtained based on the image signal S4B supplied from the image processor 22 to the communication unit 25 at this time, and sound information on Mr. A's voice gathered by the microphone, which is obtained based on the sound signal S2B supplied from the sound processor 21 to the communication unit 25, to Mr. B's robot 1.

Figure 6:
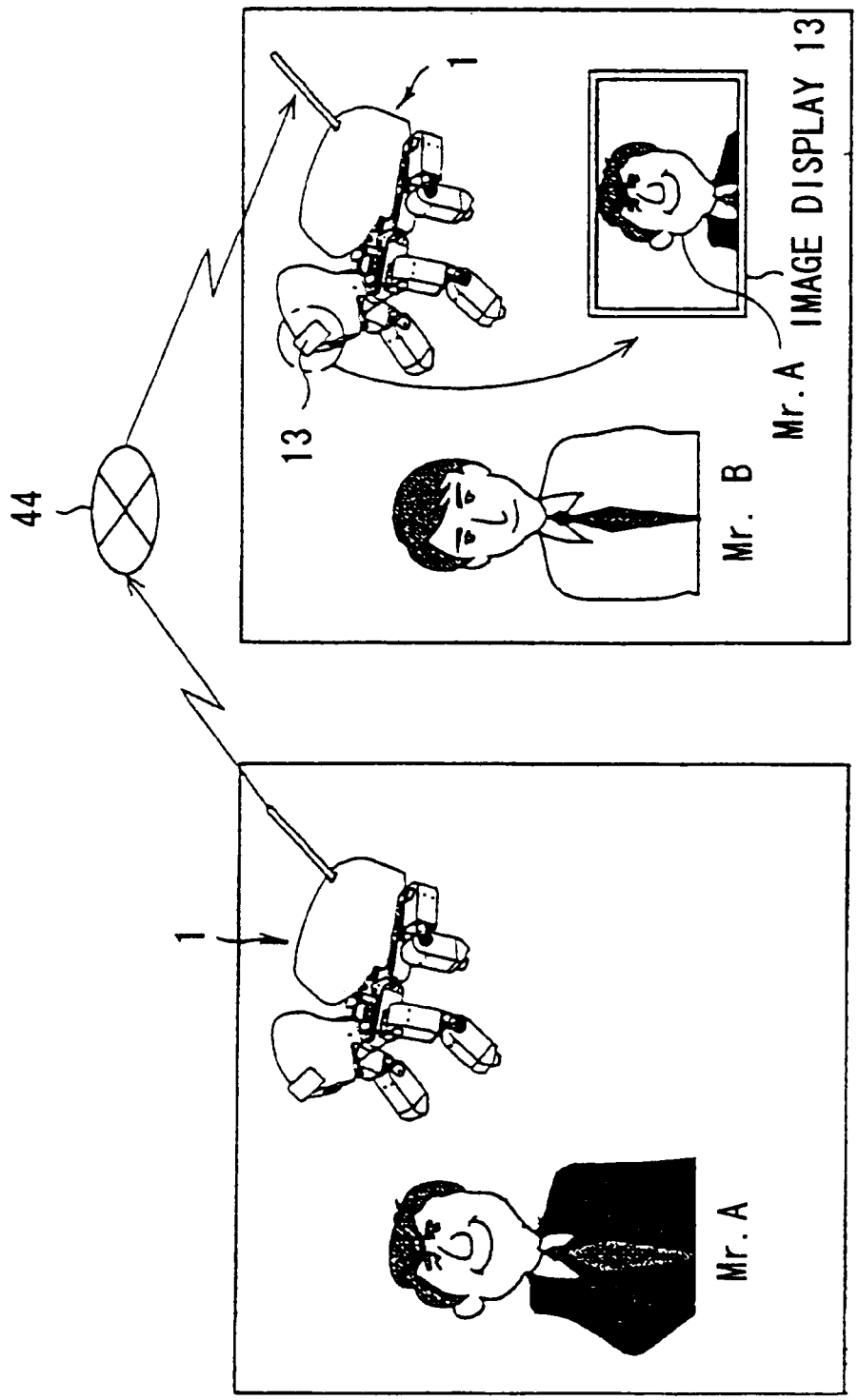
FIG. 6 is a block diagram used for explaining the telephone function of the robot.

At this time, the controller 20 of Mr. B's robot 1 controls the image processor 22 to display the image of Mr. A based on the image information transmitted through the telephone line 44 as shown in FIG. 6, and on the other hand, controls the sound processor 21 to give Mr. A's voice based on the sound information transmitted through the telephone line 44 from the speaker 11.

In similar way, the controller 20 of Mr. B's robot 1 controls the communication unit 25 to transmit image information on the image of Mr. B photographed by the image recognizing section 12, which is obtained based on the image signal S4B supplied from the image processor 22 to the communication unit 25 at this time, and the sound information on Mr. B's voice gathered by the microphone 10, which is obtained based on the sound signal S2B supplied from the sound processor 21 to the communication unit 25, to Mr. A's robot 1.

At this time, the controller 20 of Mr. A's robot 1 controls the image processor 22 to display the image of Mr. B based on the image information transmitted through the telephone line 44 on the image display 13, and on the other hand, controls the sound processor 21 to give Mr. B's voice based on the sound information transmitted through the telephone line 44 from the speaker.

In this way, in this robot 1, the users can communicate with each other using two robots with sounds and images, like a video telephone.

On the other hand, the controllers 20 of the robots 1 of Mr. A and Mr. B each always checks sounds transmitted through the telephone line 44 from his communicating party (Mr. B or Mr. A) based on the sound recognition information S2A supplied from the sound processor 21.

Figure 7:
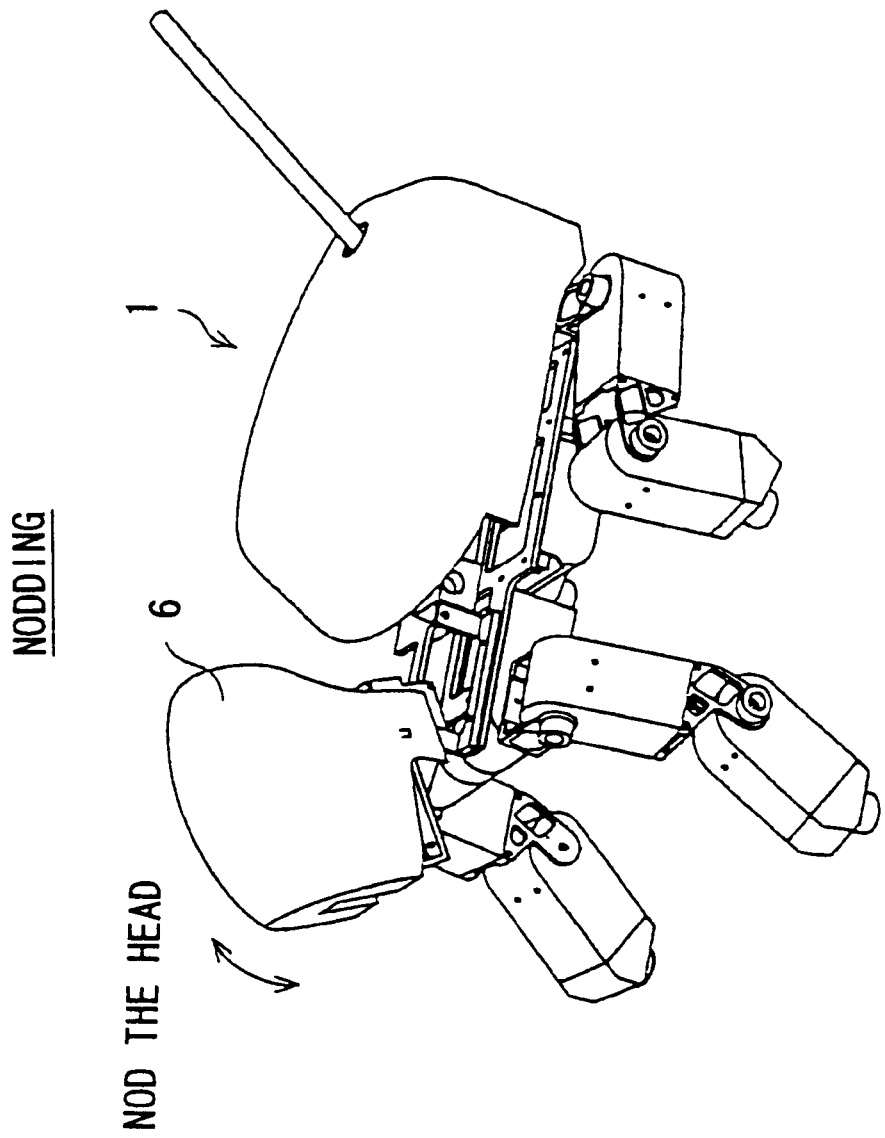
FIG. 7 is a block diagram used for explaining the telephone function of the robot.
Figure 8:
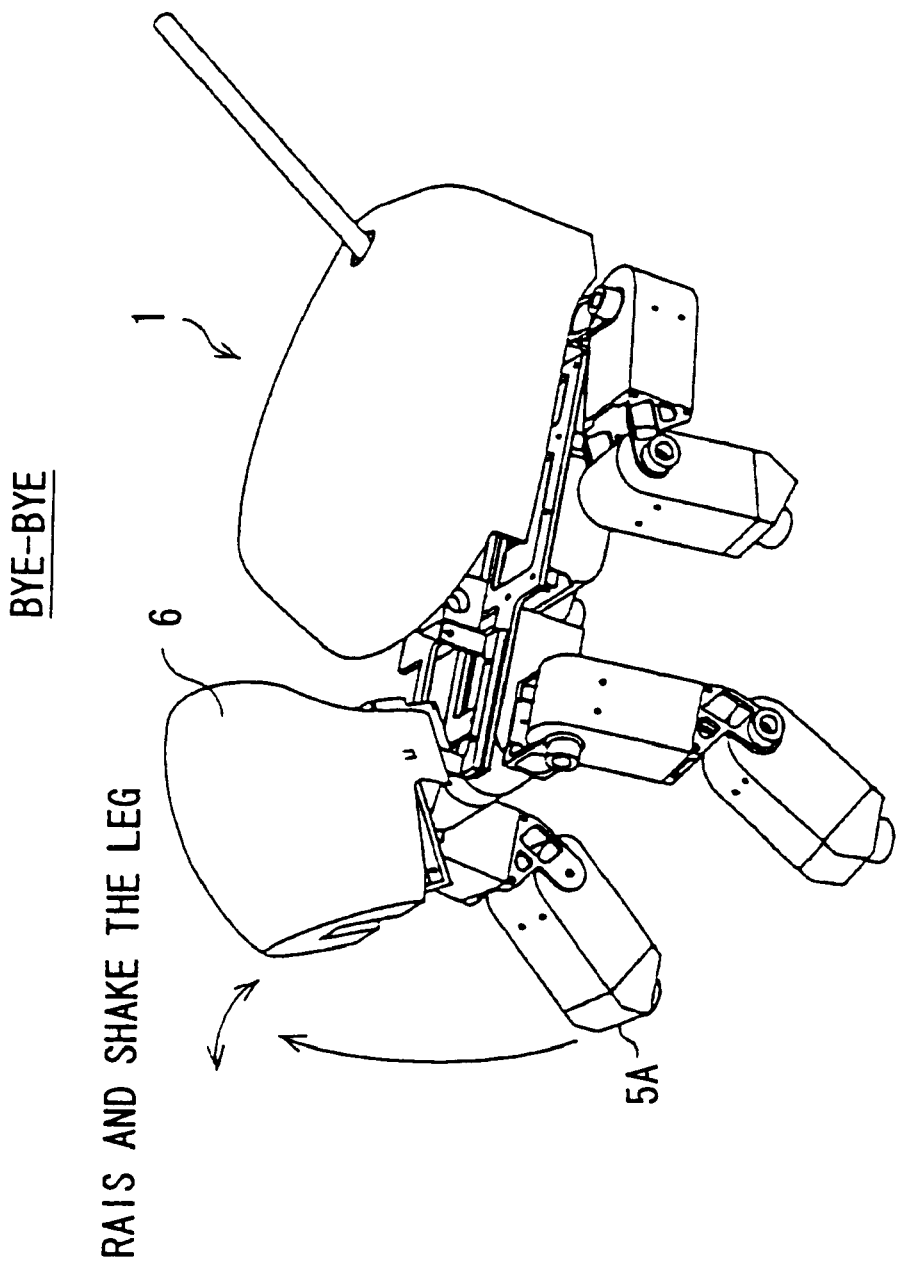
FIG. 8 is a block diagram used for explaining the telephone function of the robot.

When the controller 20 detects a previously registered word which indicates agreement or a response like "Yes" and "uh-huh" in the voice, it controls the corresponding joint mechanisms to move the head 6 upward and downward for nodding as shown in FIG. 7, for example.

Further, when the controller 20 detects a previously registered word which indicates separation like "Bye-bye" and "See you", it controls the corresponding joint mechanisms to raise and shake one leg 5A for "Bye-bye"

Figure 9:
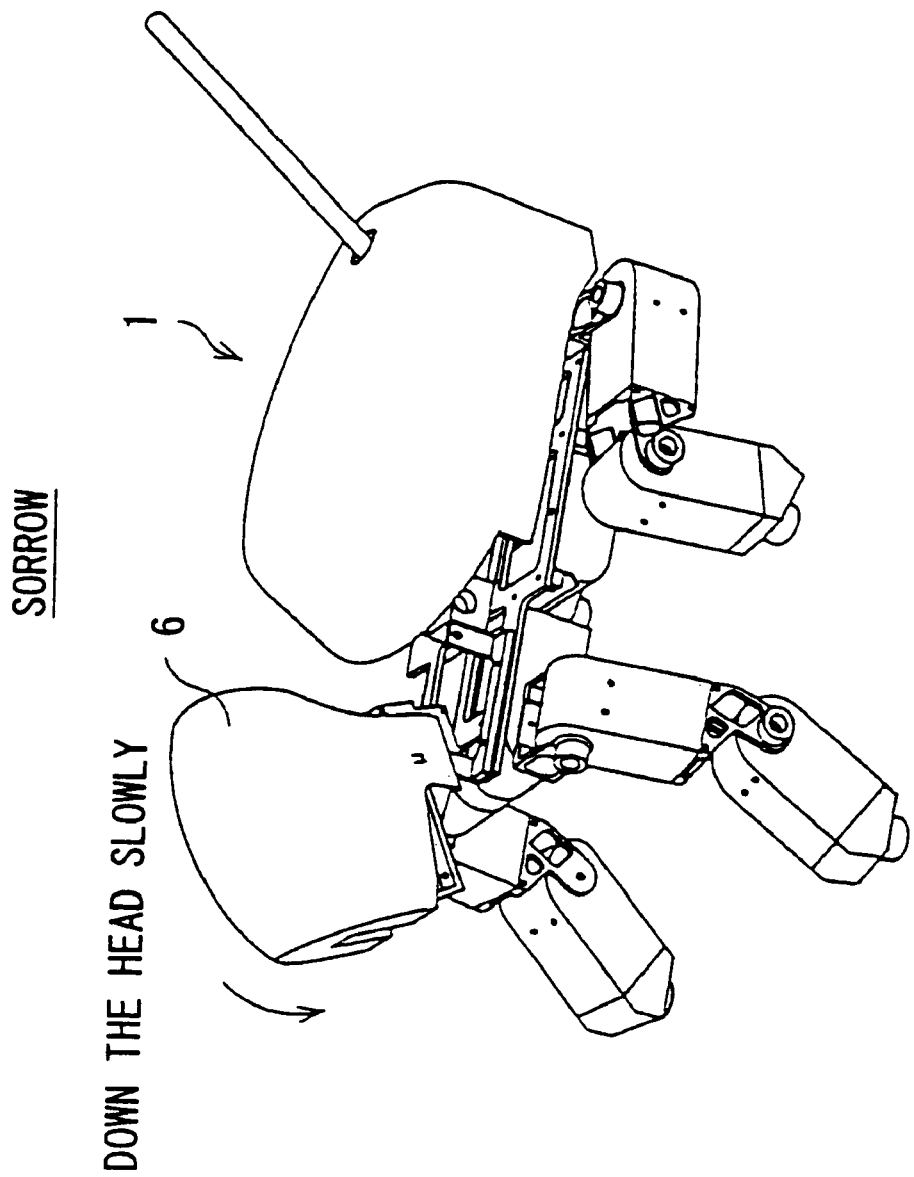
FIG. 9 is a block diagram used for explaining the telephone function of the robot.
Figure 10:
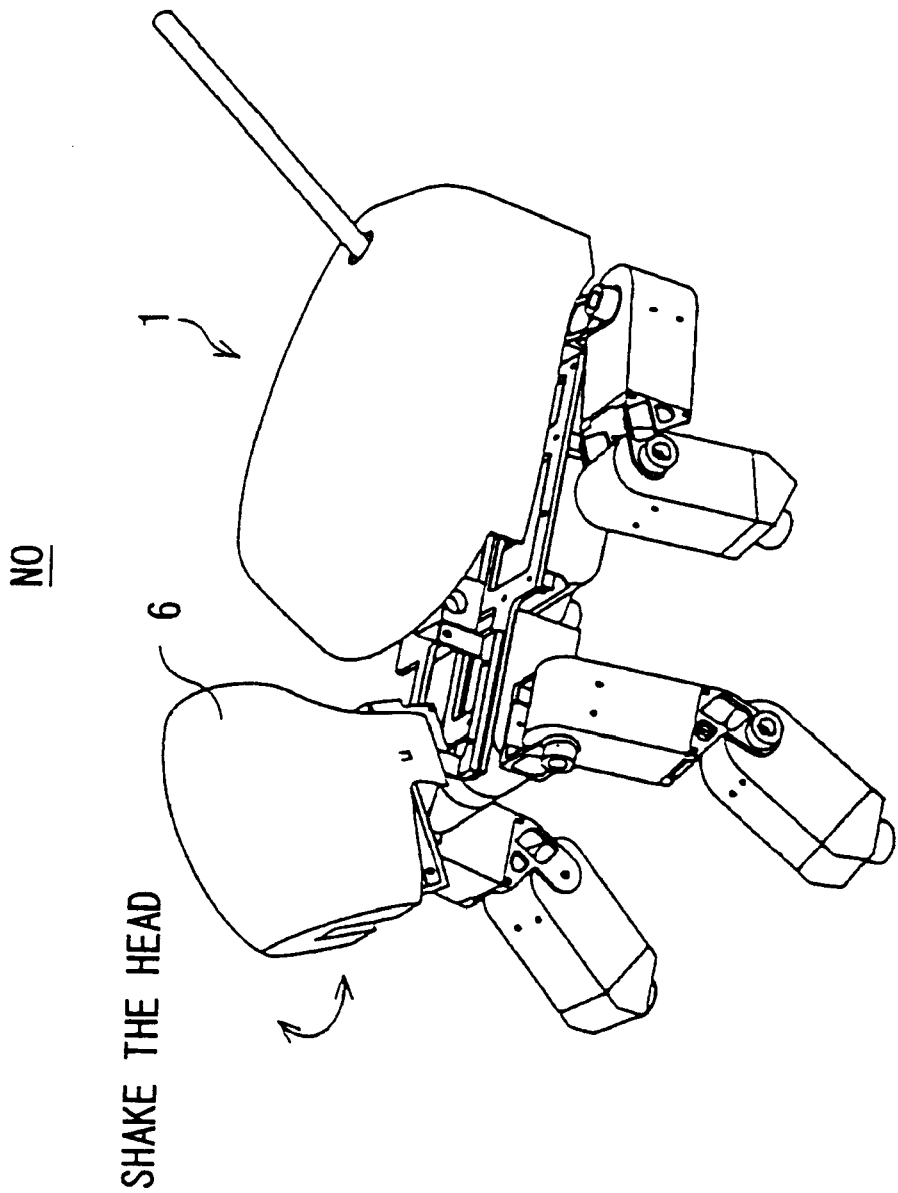
FIG. 10 is a block diagram used for explaining the telephone function of the robot.
Figure 11:
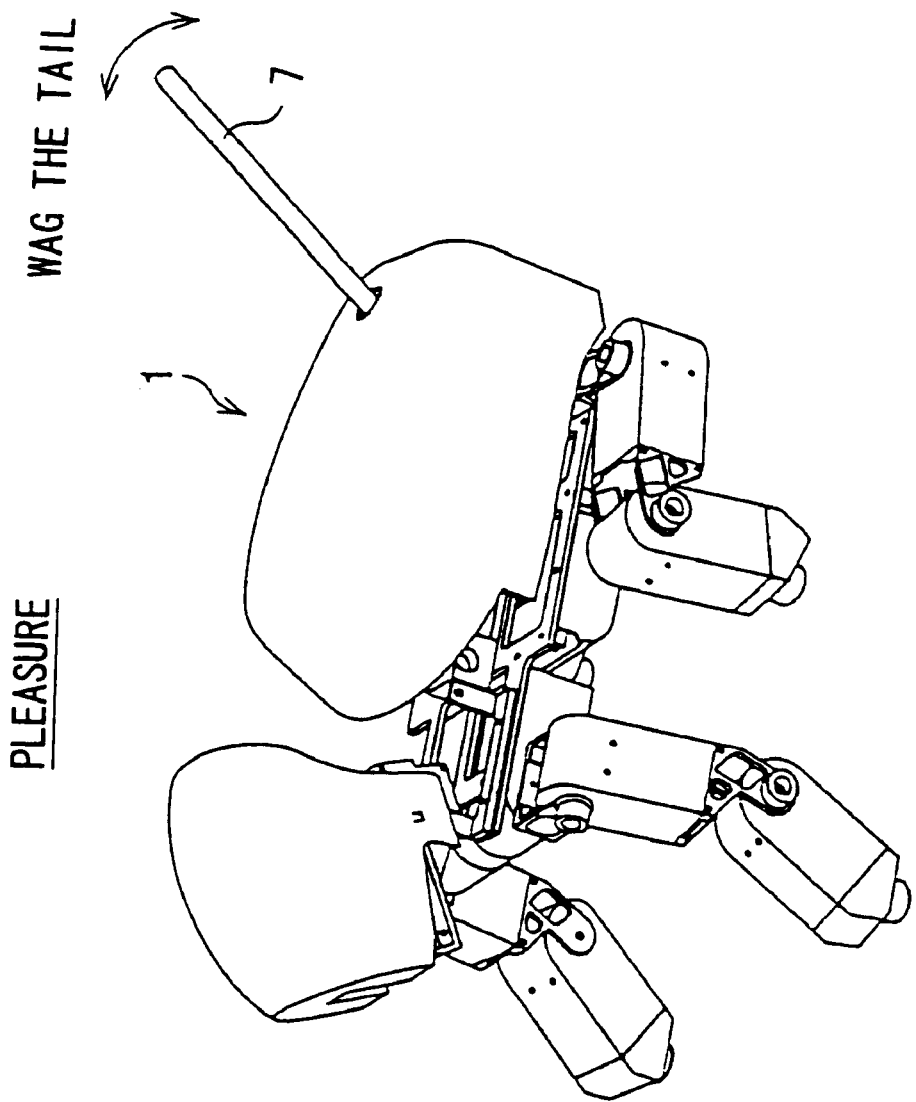
FIG. 11 is a block diagram used for explaining the telephone function of the robot.

Furthermore, in similar way, when the controller 20 detects a word which indicates pessimism like "Sad" and "Sorry", when it detects a ward which indicates negative like "No way" and "No", and when it detects a word which indicates pleasure like "Got it!" and "happy", it slowly moves the head 6 downward for pessimism as shown in FIG. 9, shakes the head 6 for negative as shown in FIG. 10, and wag the tail 7 for pleasure as shown in FIG. 11, respectively, for example.

Furthermore, other than these movements, when the controller 20 detects a ward, for example, "How big", it opens the front legs 5A, 5B of the robot 1 to express "size", and moreover, when it detects voice of laughing, it makes the robot 1 perform movements as if the robot 1 shook its body with laughing.

In this way, this robot 1 can act according to conversations based on voices of his communicating party, thereby the user can visually feel feelings of the communicating party.

Note that, the communicating party can make this robot 1 perform these movements by remote control.

Actually, in the middle of conversation between Mr. A's robot 1 and Mr. B's robot 1, when Mr. A manipulates the key input section 25 to input a prescribed second code number for manipulating the robot 1 of his communicating party (Mr. B), the controller 20 of Mr. A's robot 1 transmits this second code number to Mr. B's robot 1 via the communication unit 25.

As a result, the controller 20 of Mr. B's robot 1 controls the corresponding joint mechanisms based on the supplied second code number and a previously memorized table for movement patterns with respect to the second code numbers, in order to perform the movements shown in FIGS. 7–11, movements showing size, or movements showing laughing.

In addition, in these robots 1, two robots 1 being communicating can perform the same movement.

In actual, while Mr. A's robot 1 and Mr. B's robot 1 are communicating with each other, for example, when Mr. A manipulates the key input section 24 to input a third code number for moving his own robot 1, the controller 20 of Mr. A's robot 1 drives the corresponding joint mechanisms based on a previously memorized table for movement patterns with respect to the third code numbers, to perform the designated movements.

In addition to this, the controller 20 of Mr. A's robot 1 transmits this third code number to Mr. B's robot 1 via the communication unit 25.

At this time, the controller 20 of Mr. B's robot 1 drives the corresponding joint mechanisms based on the supplied third code number and a previously memorized table for movement patterns with respect to the third code numbers, to perform the designated movements.

Further, in these robots 1, a power from the outside (pressure of shaking hands or the like) which one of two robots 1 being communicating with each other gets can be communicated through the other robot 1.

In actual, in these robots 1, while Mr. A's robot 1 and Mr. B's robot 1 are communicating with each other, the controller 20 of Mr. A detects the given pressure based on the power detection signal S11 supplied from the power sensors 28A–28B, and transmits the pressure detection result to Mr. B's robot 1 via the communication unit 25.

At this time, the controller 20 of Mr. B's robot 1 drives the corresponding joint mechanisms based on the supplied pressure detection result to generate the pressure, which Mr. A got, in the corresponding legs 5A–5D.

In this way, in this robot 1, the intentions, feelings and movements of the user can be transmitted to his communicating party as the movements of the robot 1.

(2-2) Answering telephone function

On the other hand, this robot 1 also has an answering telephone function.

In actual, when the controller 20 of the robot 1 knows a phone call from the outside via the communication unit 25, it controls the sound processor 21 as described above to give sounds from the speaker 11 for informing of this phone call.

Then, when nobody answers this phone call within a predetermined time, the controller 20 controls the sound processor 21 to produce a fixed message (synchronized voice) for the answering telephone, and transmits this to the communication unit 25 as a sound signal S2B.

Figure 12:
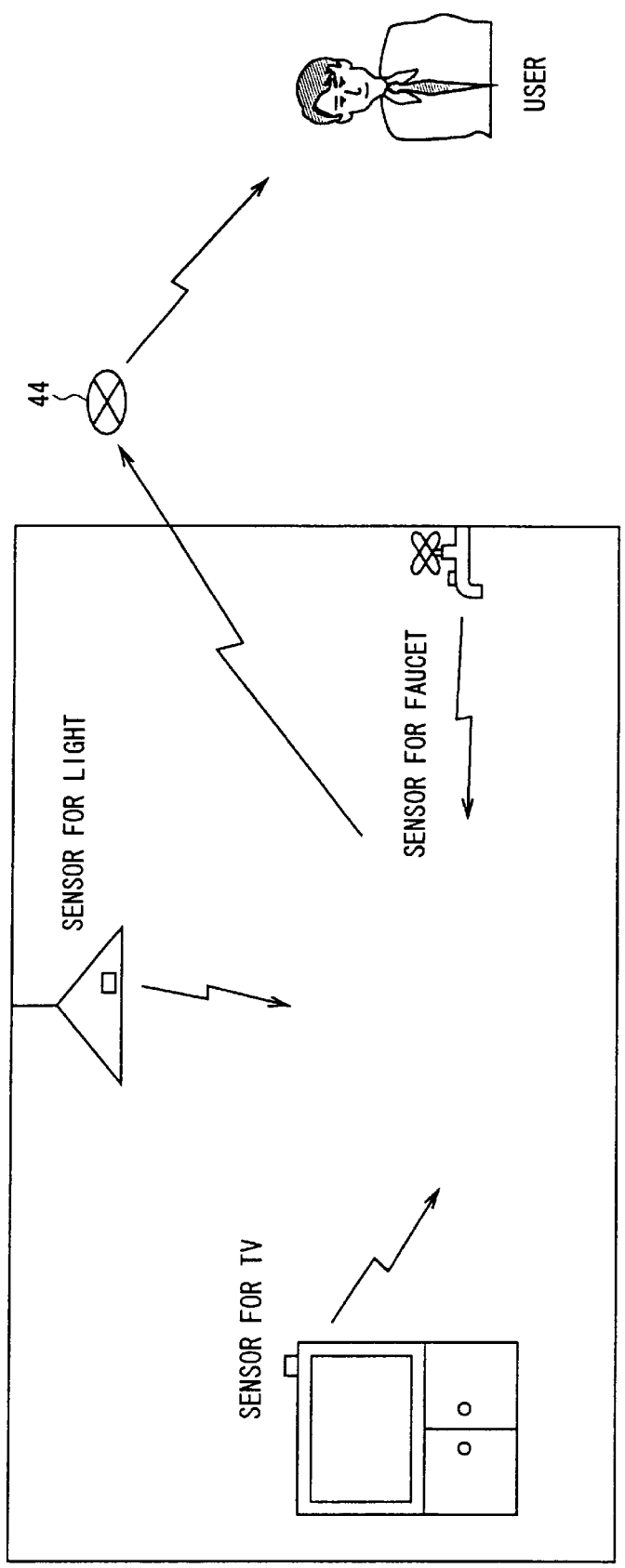
FIG. 12 is a schematic diagram used for explaining an answering telephone function.
Figure 14:
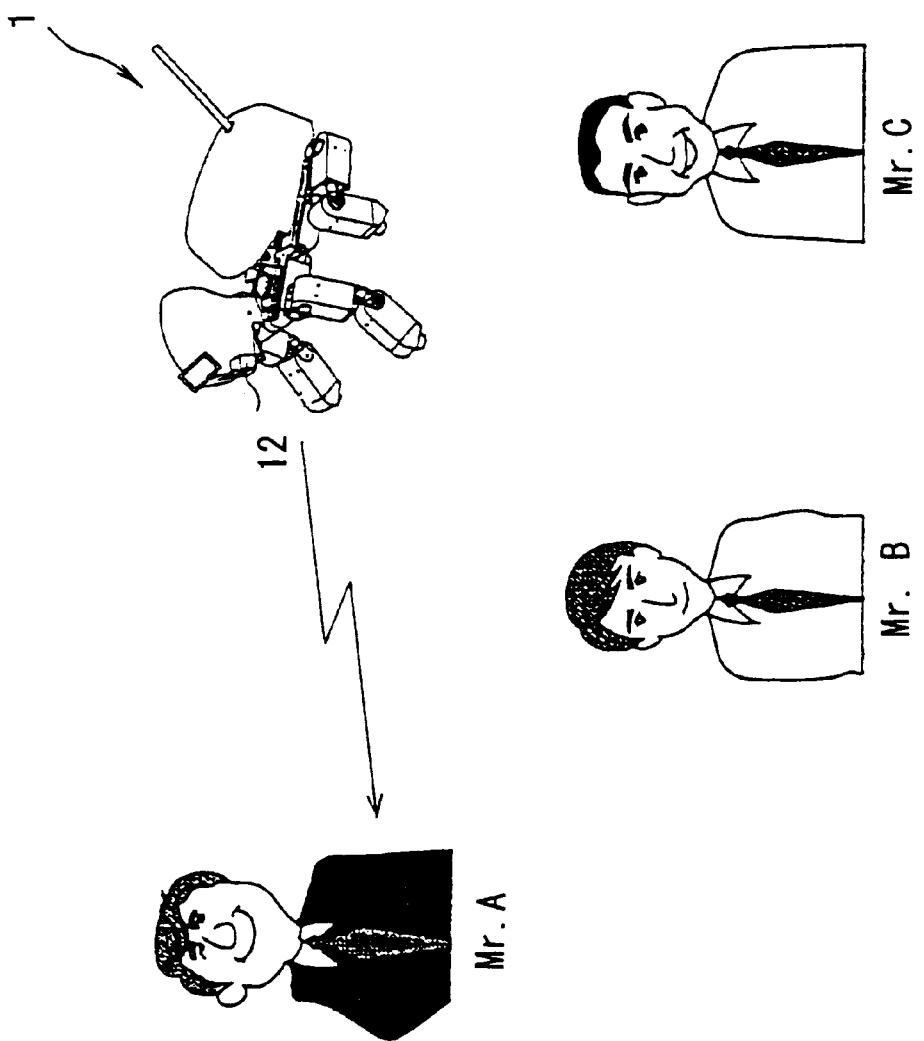
FIG. 14 is a schematic diagram used for explaining a call connecting function.
Figure 15:
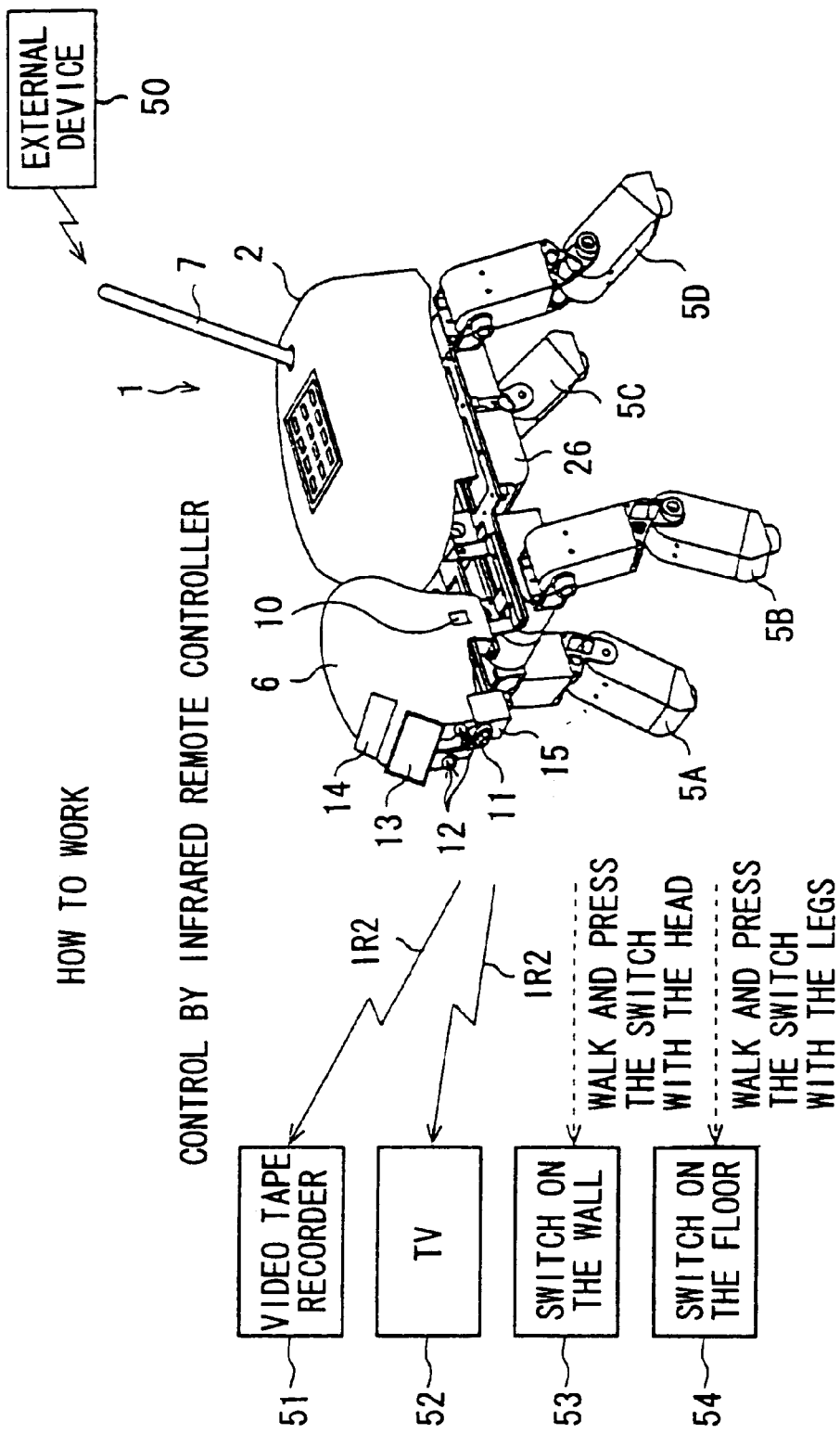
FIG. 15 is a schematic diagram used for explaining a remote control function.

At this time, for example, the controller 20 judges the user's condition of this time as shown in FIG. 13, based on outputs of various sensors installed in the house as shown in FIG. 12, which are obtained based on the output-of-sensor reception signal S12 from the output-of-sensor receiver 17 (FIG. 2), and the current time information supplied from a clock not shown.

Then, the controller 20 makes the sound processor 21 produce an optimal message based on this judgment as a message for the above answering telephone and transmit this to the communicating party via the communication unit 25.

After that, the controller 20 stores sound information and/or image information transferred from a communicating party into a memory not shown for memory until a predetermined time is passed or the line is cut off.

Then, when a request for reproducing the message is inputted by manipulating the key input section 24 or the like, the controller 20 gives the voice based on the memorized sound information from the speaker 11 and also displays the image based on the memorized image information on the image display 13.

In this way, in this robot 1, as an answering telephone, messages according to user's conditions are transmitted to the communicating party, and also messages and images from a communicating party are memorized.

Furthermore, when a call waiting mode is selected by manipulating the key input section 24 in the middle of conversation, the controller 20 of the robot 1 controls the sound processor 21 to produce predetermined music and/or sounds, and transmits this to the communicating party via the communication unit 25. In this way, this robot 1 can give music and/or a message to a communicating party for a call waiting.

(2-3) Call connecting function

On the other hand, as shown in FIG. 12, this robot 1 has a call connecting function for connecting a phone call from the outside to a corresponding user of plural users (Mr. A, Mr. B, and Mr. C).

In actual, when the controller 20 of the robot 1 knows a phone call from the outside via the communication unit 25, it detects the telephone number of this phone call, for example, by using a number display service which is usually utilized in telephones.

Then, the controller 20, based on thus detected telephone number of that phone call and the plural telephone numbers previously registered corresponding to Mr. A, Mr. B and Mr. C, judges who out of Mr. A, Mr. B, and Mr. C that phone call is for.

At this time, if the telephone number of that phone call can not be detected or if the telephone number of that phone call has not been registered, the controller 20 controls the sound processor 21 to produce a message for asking who that phone call is for, and transmits this sound information to the communicating party via the communication unit 25. Then, the controller 20, based on the sound information which is given from the communicating party as a response, judges based on the sound recognition signal S2A from the sound processor 21 who out of Mr. A, Mr. B and Mr. C that cal is for.

Then, if the controller 20 judges that that phone call is for Mr. A, it looks for Mr. A while moving by controlling the joint mechanisms of the legs 5A–5D as required, based on the image recognition signal S4A supplied via the image processor 22 and the previously registered image information on Mr. A's face.

When the controller 20 finds Mr. A through this detection, it controls the joint mechanisms of the legs 5A–5D so as to move the robot 1 toward Mr. A.

Then, when the robot 1 comes nearer to Mr. A within a predetermined distance, the controller 20 controls the corresponding joint mechanisms to produce movements, for example, "sorrow" as described in FIG. 9 in the case where that phone call for Mr. A is from a person who is previously registered as "a unfavorite"; and in the case where the phone call is from a person who is previously registered as "a favorite", for example, movements "pleasure" are performed as described above in FIG. 11.

In this way, in addition to the call connecting function, this robot can inform a user of a person, who is calling, with movements.

(2-4) Remote control function

In addition, this robot 1 has a remote control function which enables the user to call the robot 1 with an outside device 50 such as an external telephone and mobile phone, to use the dial buttons of the outside device 50 in order to input a predetermined fourth code number, and to make the robot 1 turn ON/OFF the switches of a tape recorder 51, a television set 52 and the like or turn ON/OFF the switches 53, 54 on the wall or on the floor.

In actual, when the controller 20 of the robot 1 knows a phone call from the outside device 50 via the communication unit 25 and then confirms the input of the fourth code number, it recognizes the request based on this number and the previously memorized table of movements with respect to the fourth code numbers, and executes the predetermined processing previously set, based on the recognition result.

For example, in the case of a request to turn ON/OFF an electrical appliance such as the video tape recorder 51 and the television set 52, which can be controlled under remote control, the controller 20 controls the joint mechanisms of the legs 5A–5D while confirming the surrounding situations based on the image recognition signal S4A from the image processor 22, to move the robot 1 to the setting place of the electrical appliance.

Then, when the robot 1 moves up to the area where the electrical appliance can be controlled under remote control, the controller 20 controls the infrared transmitter/receiver 15 to emit the infrared signal RI12 as a control signal toward the electrical appliance, thereby turning ON/OFF the power of the electrical appliances.

Further, in the case of a request to turn the switch 53, 54 on the wall or on the floor ON/OFF, the controller 20 controls the joint mechanisms of the legs 5A–5D to move the robot 1 to the previously memorized setting place of the switch 53, 54 while confirming the surrounding situations based on the image recognition signal S4A from the image processor 22.

Then, when the robot 1 moves up to the area where the switch 53, 54 can be controlled, the controller 20, in the case where the switch 53 is on the wall, pushes the touch sensor 14, which is attached to the head 7, against the switch 53 to turn the switch 53 ON/OFF.

At this time, the controller 20 recognizes based on the output of the touch sensor 14 whether the touch sensor 14 touched the switch 53, thereby it can surely execute ON/OFF operation.

On the other hand, in the case where the switch 54 is on the floor, the controller 20 controls the joint mechanisms of the corresponding leg 5A–5D to push the leg 5A–5D against the switch 54, thereby the switch 54 is turned ON/OFF.

Figure 16:
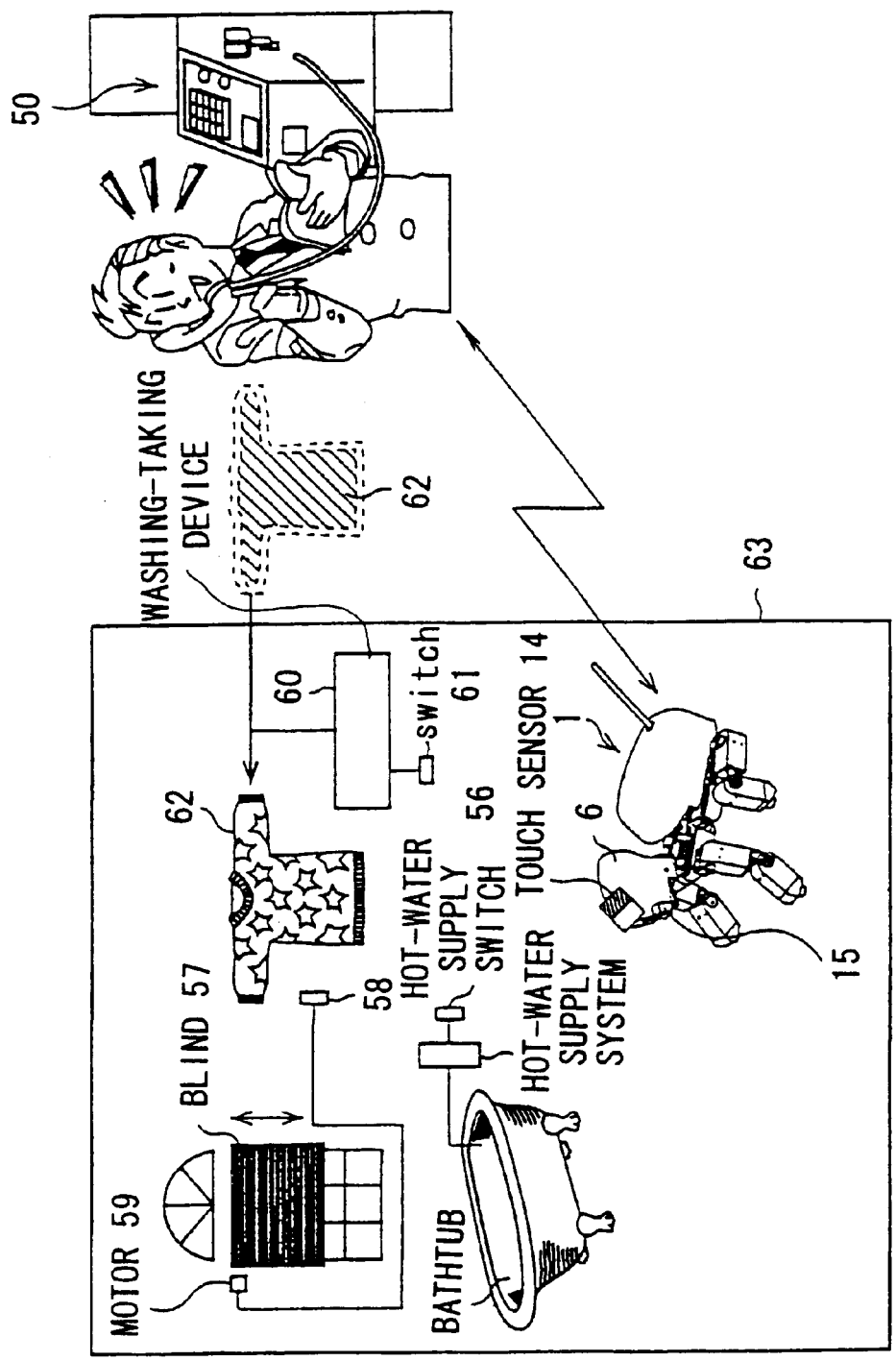
FIG. 16 is a schematic diagram used for explaining the remote control function.

FIG. 16 shows examples of other works of the robot 1. The robot 1 can turn ON/OFF the switch 56 of the hot-water supply system 55, which is installed on the wall, and can controls the switch 58 for automatically controlling a blind 57 to move a motor 59 so as to open/close the blind 57.

In addition, the robot 1 turns the switch 61 of the washing-taking device 60 ON, so that the washing-taking device 60 is driven to take washings 62 into the house 63 from the outside.

Further, in the case where movements designated under remote control are performed, if the controller 20 recognizes, based on the image recognition signal S4A from the image processor or the sound recognition signal S2A from the sound processor 21, that the controlled device was not be correctly driven by a switch operation, it controls the sound processor 21 and the communication unit 25 to produce a message of informing of this error and transmits this to the user.

In this way, using this robot 1, the user at a remote place can confirm whether the robot can surely finish operations designated by him or not, and can check the reason for this error by controlling the robot 1 as required.

(2-5) Security function

In addition, this robot has a security function to detect trouble.

In actual, the controller 20 of the robot 1 always checks input of the gas and smoke detection signal S6 from the gas sensor and smoke sensor 15 (FIG. 2), and if receiving the gas and smoke detection signal S6, it controls the sound processor 21 to give sounds from the speaker 11 to inform of this situation.

Figure 17:
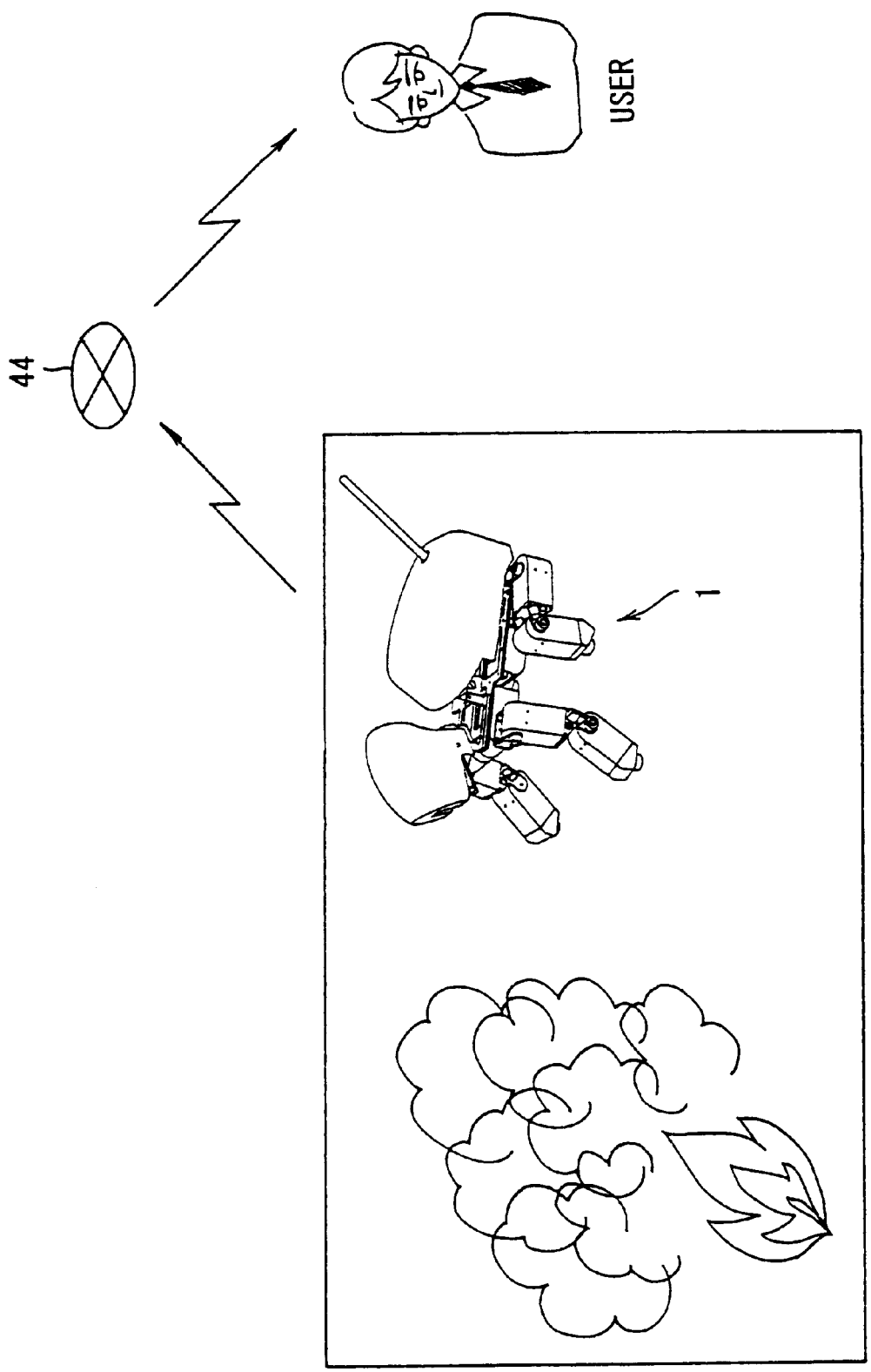
FIG. 17 is a schematic diagram used for explaining a security function.

In addition to this, in the case where an informing mode is set, the controller 20 controls the communication unit 25 and the sound processor 21 to transmit a prescribed message to the previously registered user's contact number and moreover, after that, if a predetermined time is passed in this situation or if a large amount of gas or smoke is detected, the controller 20 controls the communication unit 25 and the sound processor 21 and calls the police or the fire department to inform of this situation, as shown in FIG. 17.

Figure 18:
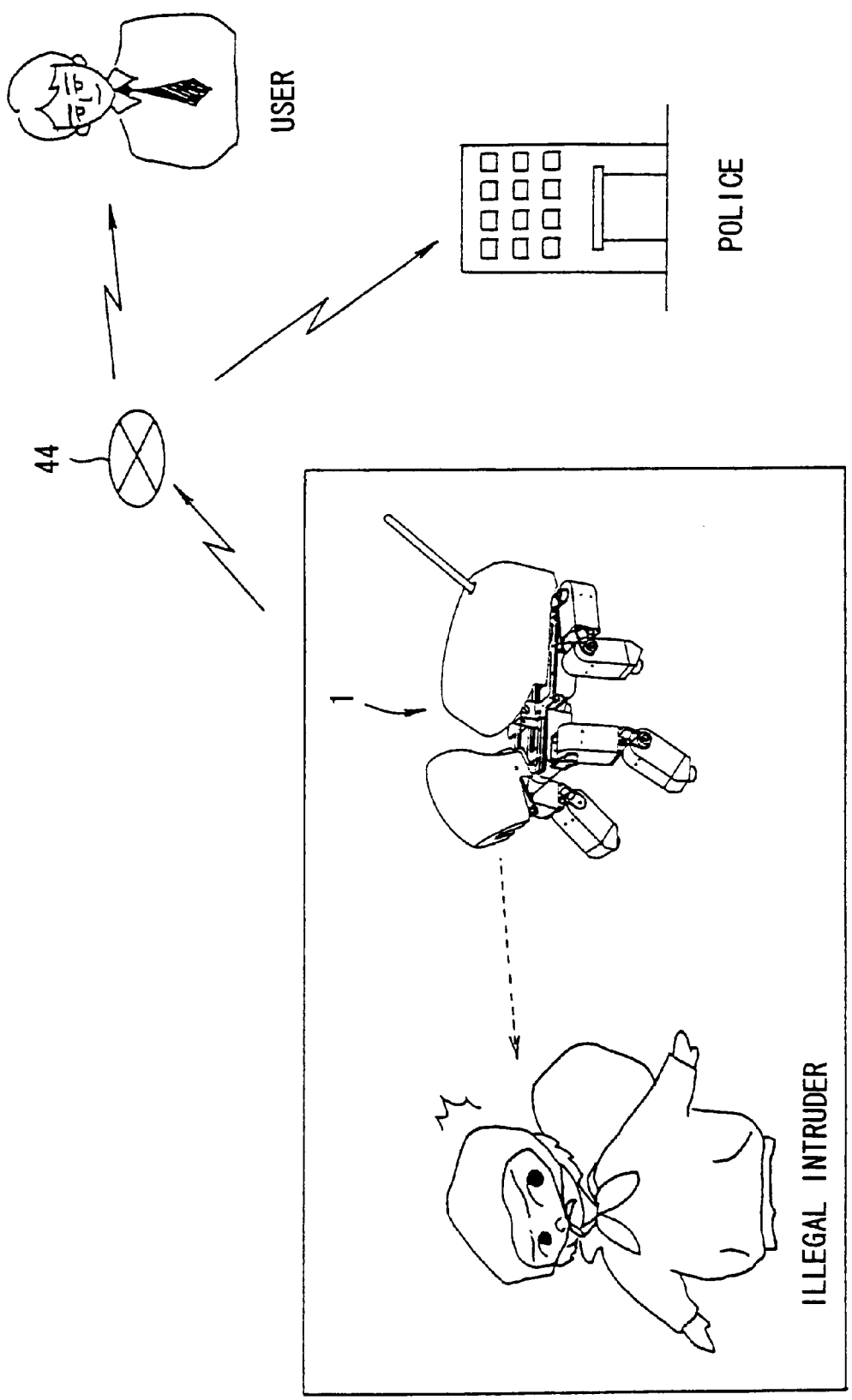
FIG. 18 is a schematic diagram used for explaining the security function.
Figure 19:
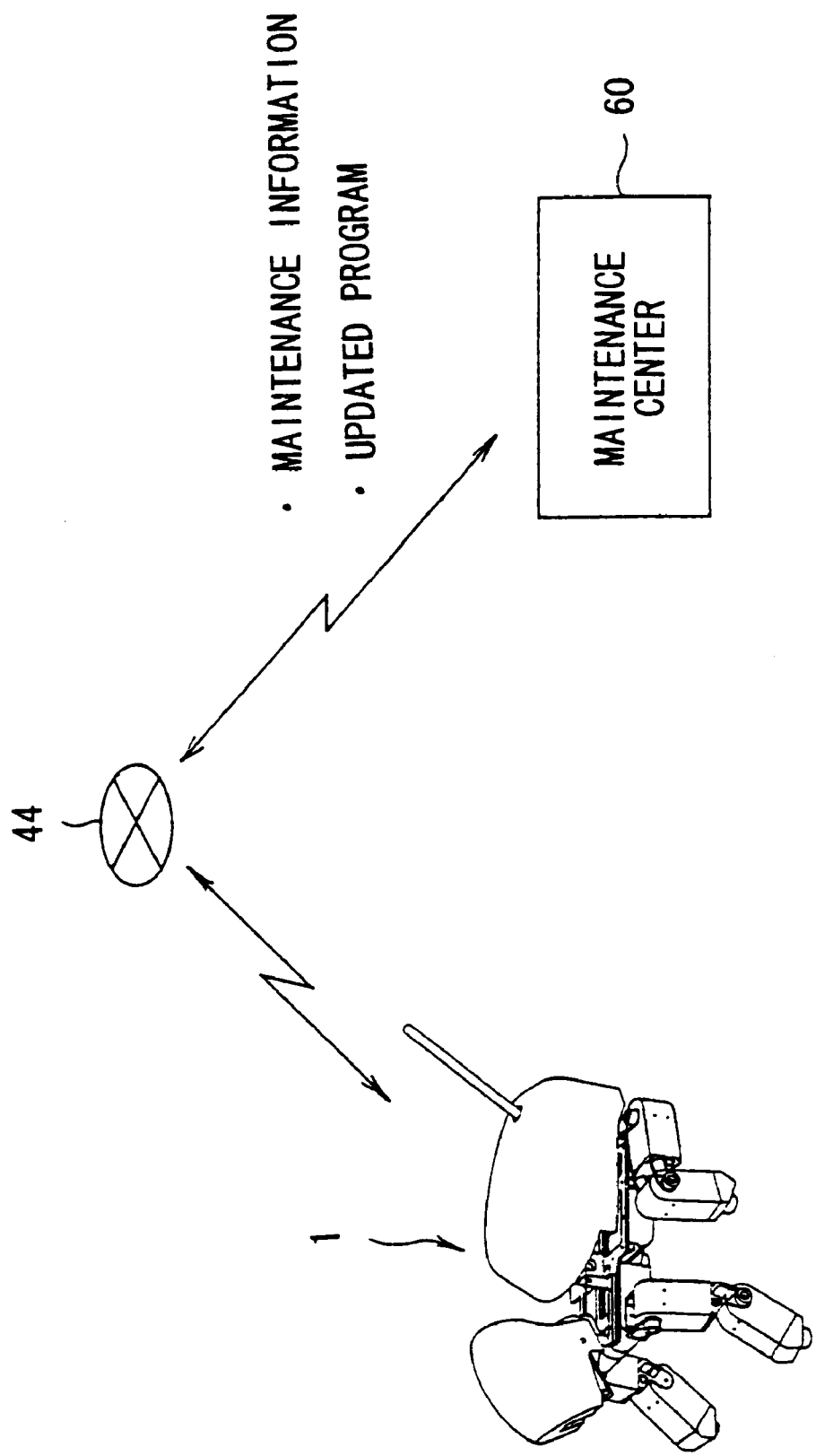
FIG. 19 is a schematic diagram used for explaining an automatically maintenance and version-up function.
Figure 20:
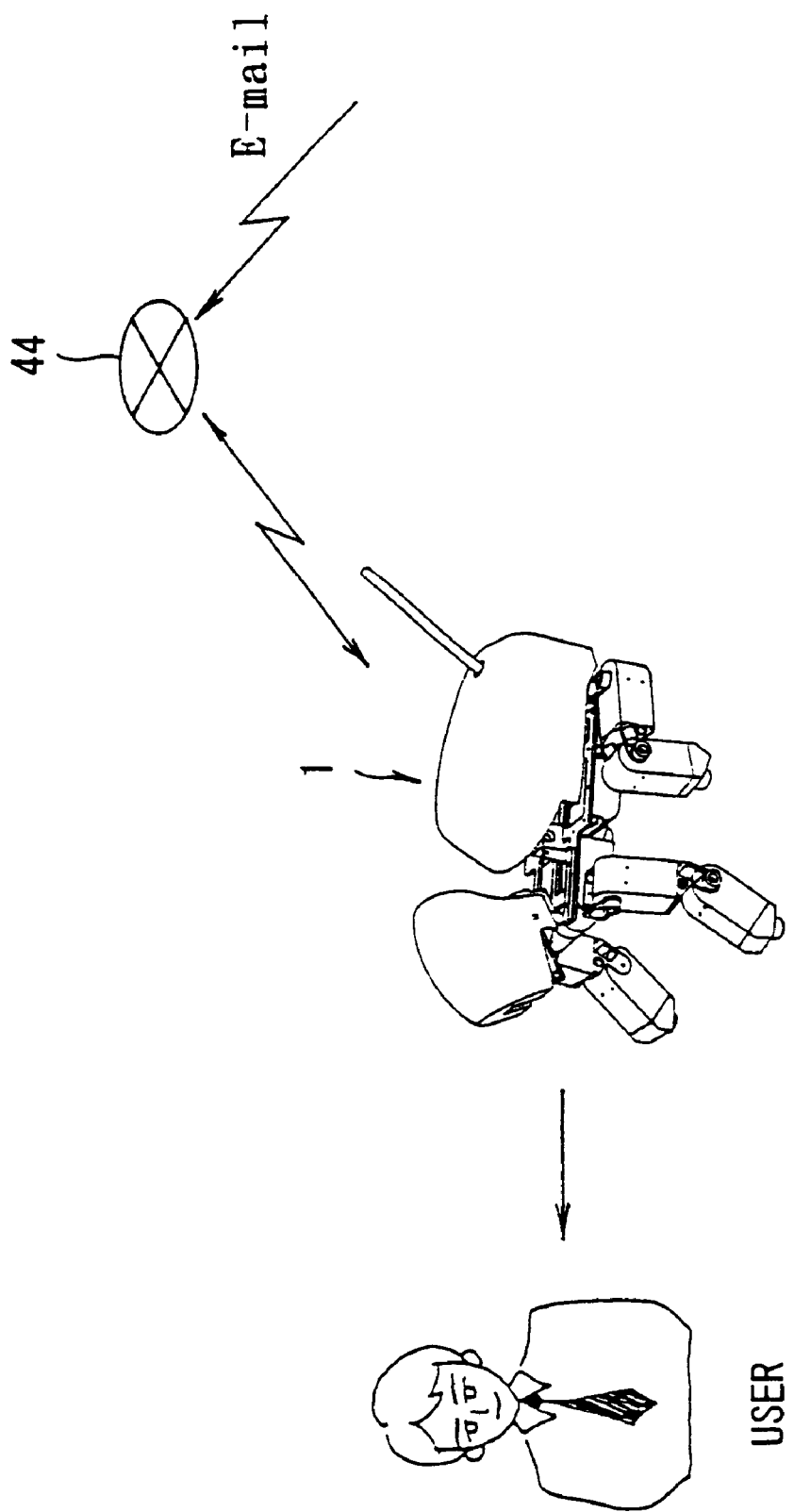
FIG. 20 is a schematic diagram used for explaining an E-mail management function.
Figure 21:
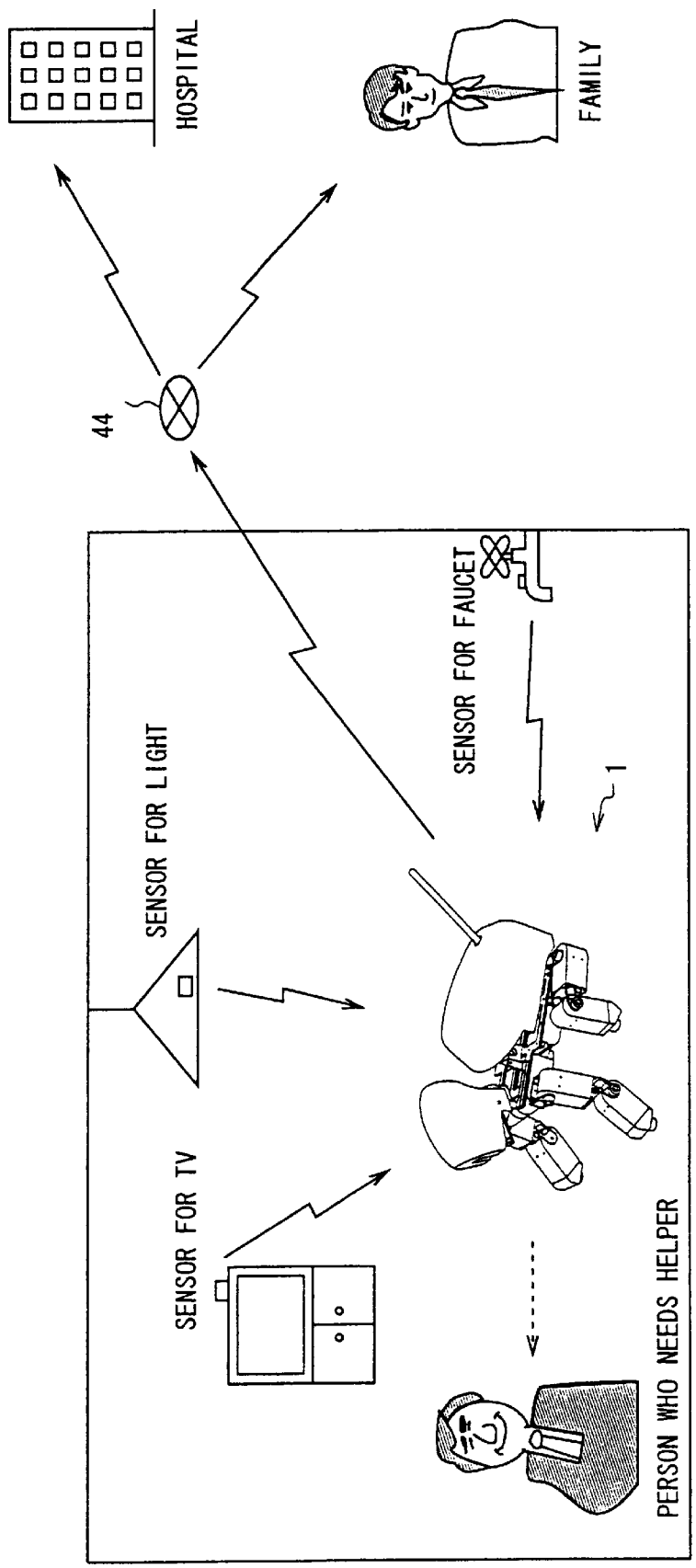
FIG. 21 is a schematic diagram used for explaining a helper-requiring-person monitoring function.

Further, for example, in the case where an answering telephone mode of the security function is set, the controller 20 always checks the house's condition based on the image recognition signal S4A from the image processor 22 and the sound recognition signal S2B from the sound processor 21. If a person who can not be recognized or identified (who is not previously registered) is detected, the controller 20 controls the communication unit 25 and the sound processor 21 to transmit a prescribed message to the previously registered user's contact number and the police, as shown in FIG. 18.

Furthermore, in addition to these functions, in the case where the gas and smoke detection signal S6 is input or in the case where a person who can not be recognized or identified is detected while the answering telephone mode of the security function is set ON, the controller 20 sequentially memorizes image information from the image processor 22 and sound information from the sound processor 21 at this time, and then, when a reproduction request is made, it displays images based on the memorized image information on the image display 13 and gives sound based on the memorized sound information from the speaker 11.

In this way, the robot 1 can memorize and show situations in the case of disaster, accident, illegal intruder, or the like, like a voice recorder of an airplane.

(2-6) Automatically maintenance and version-up function

In addition, this robot 1 has an automatically maintenance and version-up function for automatically performing maintenance by calling a maintenance center 60 or for automatically updating a version.

In actual, the controller 20 of the robot 1 regularly calls the maintenance center 60 by controlling the communication unit 25. And the controller 20 communicates with a check device of the maintenance center 60 to check various functions including the controller 20 under the control of the check device. If the controller 20 detects abnormality in any parts, it communicates this situation to the check device of the maintenance center 60, and moreover, controls the image processor 22 to display a message on the image display 13 for informing of this situation.

Further, the controller 20 controls the communication unit 25 to regularly call the maintenance center 60. Then, the controller 20 takes in an updated program supplied from the maintenance center 60 via the communication unit 25, and stores it in an internal memory for programs, not shown, in place of the old program.

Further, with respect to the updated programs which are one-sidedly given through the telephone line, the controller 20 takes in these via the communication unit 25 similarly to the above cases, and then stores these in a memory for programs as described above.

In this way, this robot 1 can automatically perform maintenance or update of a version.

(2-7) E-mail management function

On the other hand, this robot 1 has an E-mail management function for managing E-mail.

In actual, when the controller 20 of the robot 1 recognizes the reception of E-mail, it takes in the text data in an internal memory not shown.

Next, the controller 20 judges based on data about a designation who this E-mail is for, and then it looks for the corresponding user with the method described in the call connecting function, to come nearer to him, based on this judgment. After that, it controls the sound processor 21 to give a message from the speaker 11 for informing of this E-mail.

At this time, similarly to the case described in the call connecting function, for example, if the sender of E-mail is previously registered as "an unfavorite", the controller 20 controls corresponding joint mechanisms to produce the movement for "sorrow" as described in FIG. 9; and in the case where the sender of E-mail is previously registered as "a favorite", the movement for "pleasure" as described in FIG. 11 is produced.

In this way, this robot 1 can inform the user of the sender of E-mail with movements, in addition to the management.

(2-8) Helper-requiring-person monitoring function

Further, this robot 1 has a helper-requiring-person monitoring function for monitoring a user, such as an elderly person and a child, who needs a helper or monitor.

In actual, in the helper-requiring-person monitoring function is set ON, the controller 20 of this robot 1 always monitors the user's movements and conditions designated by another user based on the image recognition signal S2A from the image processor 22, the sound recognition signal S4A from the sound processor 21, and the output-of-sensor reception signal S12 from the output-of-sensor receiver 17 (FIG. 2).

If the user does not move over a predetermined time or if the user does not give voice, the controller 20 looks for the user to come nearer to him as described in the call connecting function.

Then, when the controller 20 comes nearer to the user up to a predetermined distance, it controls the sound processor 21 to give a prescribed message or music from the speaker 11. After that, it keeps on monitoring the user's movements, and if he shows no reaction, it controls the sound processor 21 and the communication unit 25 to call the previously registered family and hospital, and transmits a message to inform of this trouble.

(2-9) Dancing function

Further, this robot 1 has a dancing function of dancing to music gathered by the microphone 10 or of dancing based on music transmitted through the telephone line 44 or MIDI (Musical Instrument Digital Interface) signals generated by coding note information.

Here, the MIDI standard is the international standard for connecting a synthesizer, a rhythm box, a sequencer, a computer, and so on, to each other. In addition, the MIDI standard is defined, in which information such as note-on (give sounds), note-off (stop sounds), pitch-bender (continuously change scales) and control change (other various kinds of control) is transmitted together with an identification number as a MIDI signal at 130 per one second. As a result, all information expressed by playing the musical instruments by people can be transmitted as MIDI signals.

In the case where the dancing function is set ON, when the MIDI signal through the telephone line 44 is supplied, the sound processor 21 of this robot 1 takes in this via the communication unit 25, extracts information on music characteristics such as rhythm, intervals, strength of tone, from the MIDI signal and moreover, produces a synchronized signal based on the extracted information.

For example, the sound processor 21 extracts only information on a dram, and with timing of beating the drum as a reference on the basis of the extracted information, produces a synchronized signal by generating pulse at that timing, and then transmit this to the controller 20.

Further, in the case where music is gathered by the microphone or in the case where the music (non-MIDI signals) is supplied through the telephone line or the like, the sound processor 21 detects music characteristics such as rhythm, intervals, strength of tone of the music, based on the music obtained based on the gathered signal 1 given from the microphone 10 or the music transmitted through the telephone line, and moreover, produces a synchronized signal based on the music characteristic of the music based on the detection result similar to the above case, and transmits this to the controller 20.

Figure 22:
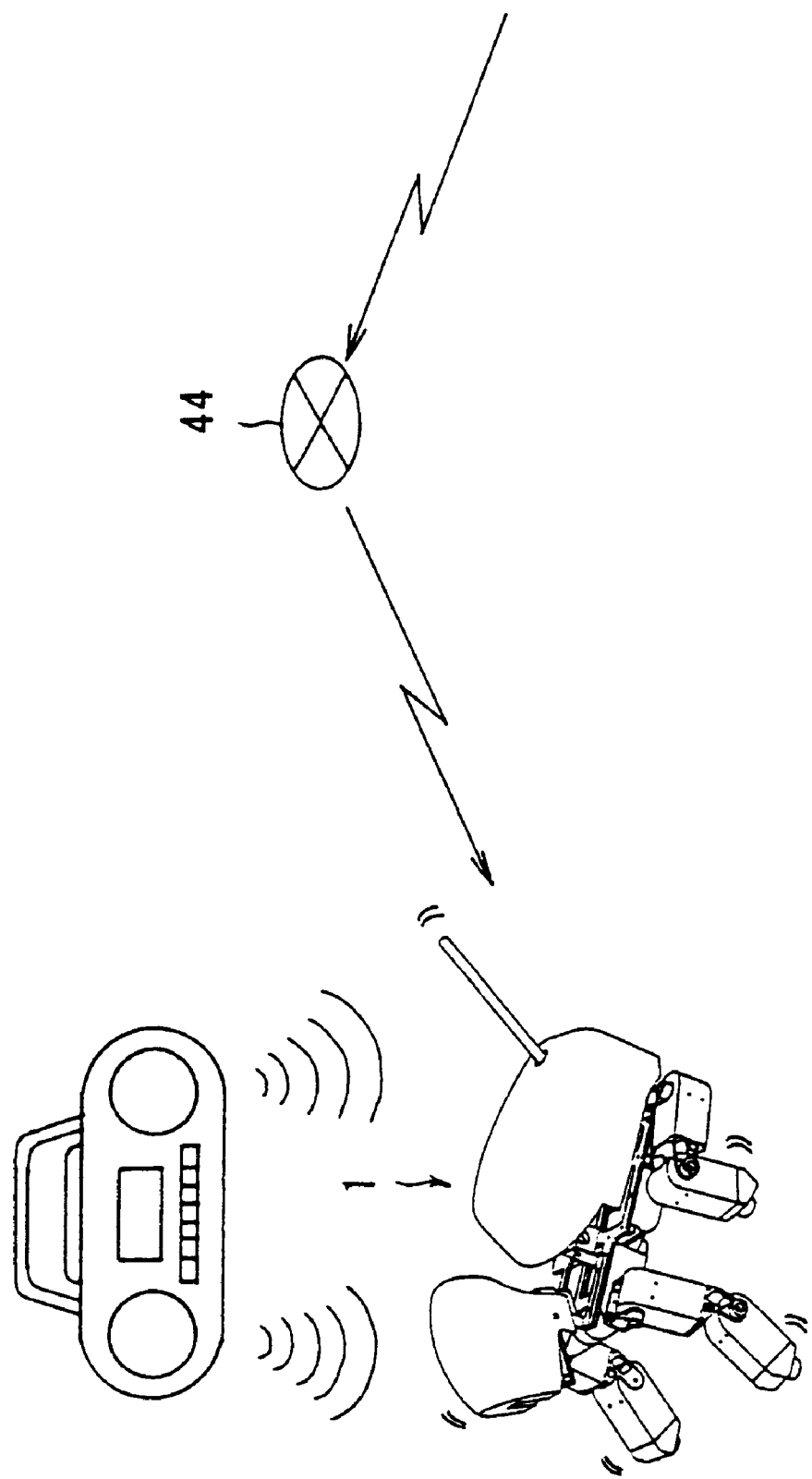
FIG. 22 is a schematic diagram used for a dancing function.

Then, the controller 20 moves the joints mechanisms of the joint parts in the legs 5A–5D, the connecting parts between each leg 5A–5D and the body 2 and the connecting part between the head 6 and the body 2 based on thus generated synchronized signal, so that the robot 1 moves as if it danced to rhythm, as shown in FIG. 22.

(2-10) Inter-robot communicating function

Furthermore, this robot 1 has an inter-robot communicating function, so that the robots 1 can play such a soccer game together while communicating.

In actual, in the case where the inter-robot communicating function is set ON, the controller 20 of the robot (hereinafter, referred to as the first robot) 1 monitors the position and condition of the other robot (hereinafter, referred to as the second robot) 1 based on the image signal S4 from the image processor 22.

When the controller 20 of the first robot 1 wants the second robot 1 perform desired movements, it transmits to the second robot 1 a request to perform the movements via the communication unit 25.

At this time, the controller 20 of the second robot 1 drives the required joint mechanisms based on the movement request supplied via its own communication unit 25, to perform the designated movements.

In this way, in these robots 1, the robots 1 control each other's robots 1 to work together while communicating with each other.

Figure 24:
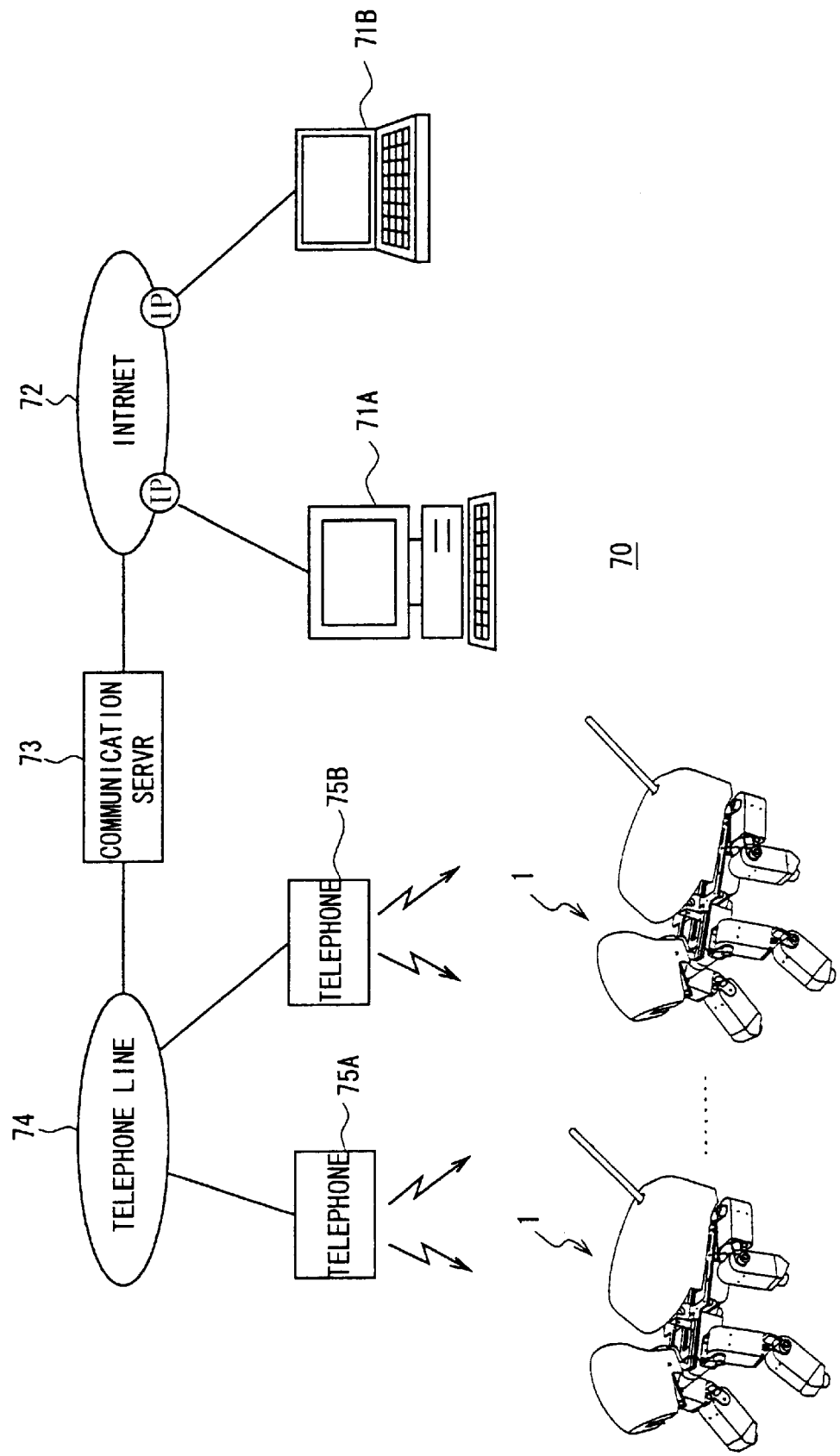
FIG. 24 is a schematic diagram used for the inter-robot communicating function.

Note that, FIG. 24 shows the structure example of the game system 70, for example, in which two users play the soccer game by using such the inter-robot communicating function.

In the game system 1, two personal computers 71A, 71B are used and each user uses his own personal computer 71A, 71B to input a performance request such as "kick the ball forward and attack" and "attack from the right and shoot the ball".

In this case, these personal computers 71A, 71B transmit to the robots 1 of respective teams a command corresponding to the input request, through the Internet 72, a communication server 73, a telephone line 74, and the telephone 75A, 75B in order.

As a result, the robots 1 of the respective teams execute the requests while communicating with each other and control each other's robots 1 based on requests, as described above.

In this way, in this game system 70, two users control the robots of the respective teams to play the soccer game.

(3) User identifying method of robot 1

Next, a human recognizing and identifying method for realizing the above-mentioned call connecting function, helper-requiring-person monitoring function, security function and so on, will be described.

Figure 25:
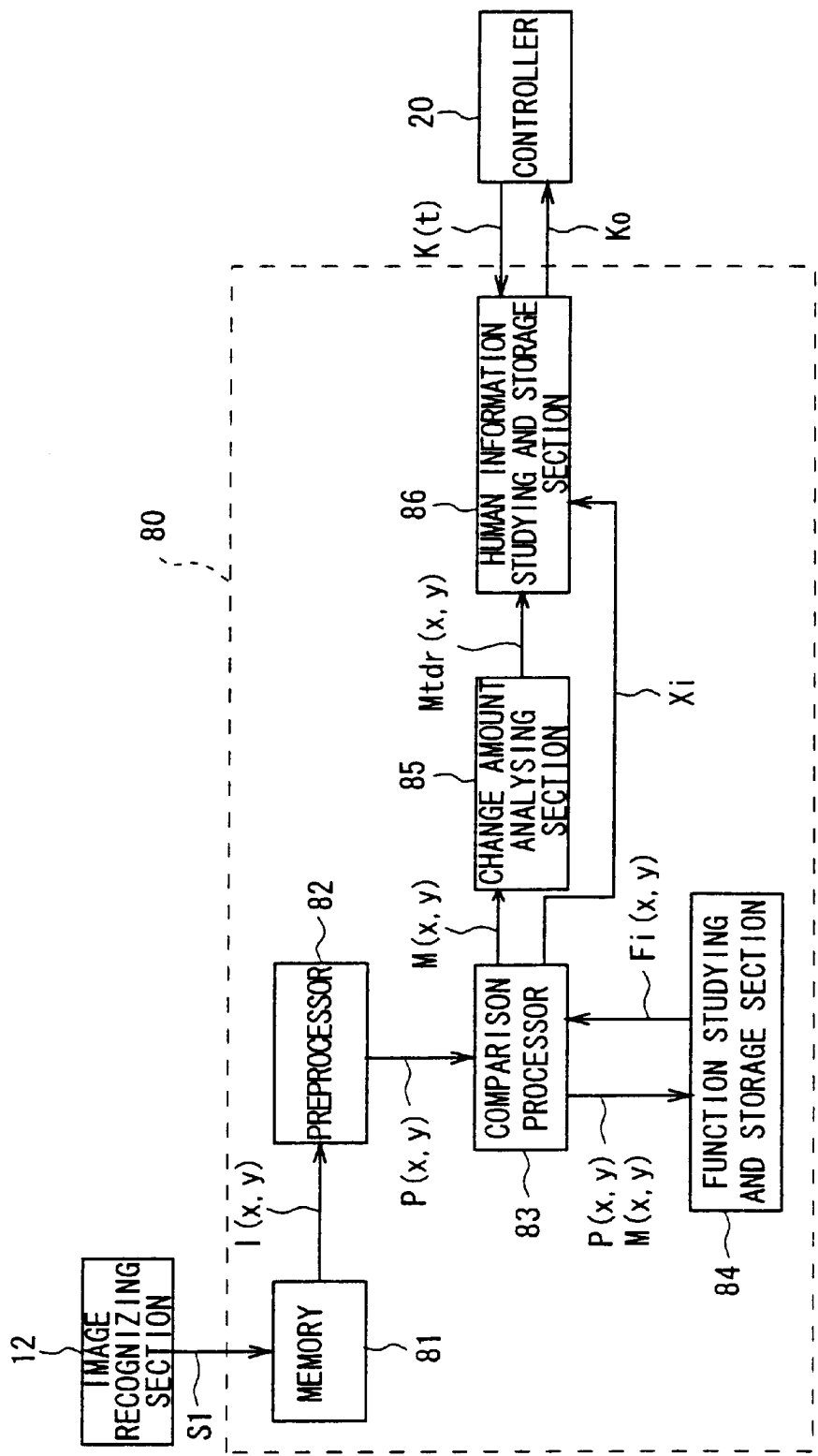
FIG. 25 is a block diagram showing the structure of a face-pattern studying and recognizing processing section.

At first, in this robot 1, the image processor 22 recognizes and identifies users, for example, by using the method disclosed in Japan Patent Laid Open No. 89344/94. Concretely, a face pattern studying and recognizing part 80 as shown in FIG. 25 is provided in the image processor 22 to recognize and identify users.

This face pattern studying and recognizing pat 80 quantizes the face part of a human from image information which is supplied from the image recognizing section 12, with a memory 81 composed of a RAM (Random Access Memory) and an analog/digital converter, for example, every eight bits, and stores the obtained face image data I(x,y) being secondary luminance information on the x-y plane, in the RAM of the memory 81.

A preprocessor 82 calculates, as to each of r pieces of functions $F_i(x,y)$ (i=1,2, . . . ,r) previously stored in a function studying and storage section 84 as a basic model of the face image data I(x,y) stored in the memory 81, a contribution degree $X_i$ which is the correlation amount with respect to the face pattern P(x,y).

Further, a comparison processor 83 detects a function $F_{MAX}(x,y)$ having the maximum contribution degree $X_{MAX}$ ($1 \leq MAX \leq r$) based on the calculation result, changes the function $F_{MAX}(x,y)$ or the face pattern P(x,y) until the contribution degree $X_{MAX}$ of this function $F_{MAX}(x,y)$ becomes the maximum or the largest point, in order to calculate the change amount M(x,y) which is the difference between the function $F_{MAX}(x,y)$ and the face pattern P(x,y).

This change amount M(x,y) is supplied to the function studying and storage section 84 and a change amount analyzing section 85. In addition, to the function studying and storage section 84, the face pattern P(x,y) is also supplied.

The function studying and storage section 84 is formed of the neural-network, and stores the r pieces of functions $F_i(x,y)$ (i=1,2, . . . , r) as a basic model of the face pattern P(x,y) as described above.

Then, the function studying and storage section 84 uses the supplied change amount M(x,y) to change the function $F_{MAX}(x,y)$ or the face pattern P(x,y), and updates the function $F_{MAX}(x,y)$ based on the changed function $F_{MAX}'(x,y)$ and the changed face pattern P'(x,y) on the x-y plane.

On the other hand, the change amount analyzing section 85 analyzes the change amount M(x,y) supplied from the comparison processor 83, eliminates components of the differences in top, bottom, right, and left sides, in the shift due to rotation, or of the difference in size due to such the perspective and the expansion and reduction of the image recognizing section 12 (FIG. 2), of the face pattern P(x,y) on the screen, from the change amount M(x,y), in order to generate a new change amount Mtdr(x,y), and then transmits this to a human information studying and storage section 86.

In the case where the movement mode is a study mode, the human information studying and storage section 86 stores the supplied change amount Mtdr(x,y) into an internal memory not shown by correlating it with human information K(t) which is the function of numbers t (t=1,2, . . . , T; T is the number of human's faces) assigned to, for example, humans (faces) and is supplied from the controller 20 (for example, treating the average of plural change amounts Mtdr(x,y), Mtdr'(x,y), Mtdr''(x,y) . . . with respect to the face image of the same person t as the human information K(t)).

That is, in the case where the movement mode is the study mode, the human information studying and storage section 86 stores the change amount Mtdr(x,y) itself of a human t outputted from the change amount analyzing section 85 as human information, and after that, whenever the change amount Mtdr(x,y) of the same person t is input, it updates the human information K(t) based on the change amount Mtdr (x,y).

Further, in the case where the movement mode is the recognizing mode, the human information studying and storage section 86 calculates, for example, an Euclidean distance between the change amount Mtdr(x,y) supplied from the change amount analyzing section 85 and the human information K(t) previously stored in the internal memory, and transmits the number t of the human information K(t) having the shortest Euclidean distance as a recognition result K0 to the controller 20.

Then, the controller 20 recognizes who the photographed person is (the person's name), based on this recognition result K0 and the person's name previously stored corresponding to the number t at the time of registration.

Then, in the face pattern studying and recognizing part 80 having such the structure, the change amount analyzing section 85 analyzes the change amount M(x,y), eliminates the parallel movement components, the rotary movement component, and the expansion and reduction component, of the face pattern P(x,y), which are included in the change amount M(x,y), and updates the reference pattern stored in the human information studying and storage section 86 based on the new change amount Mtdr(x,y). As a result, the high recognition rate can be obtained.

(4) Synchronized signal producing method of robot 1

Sequentially, a method of producing the aforementioned synchronized signal for realizing the aforementioned dancing function will be described.

Figure 26:
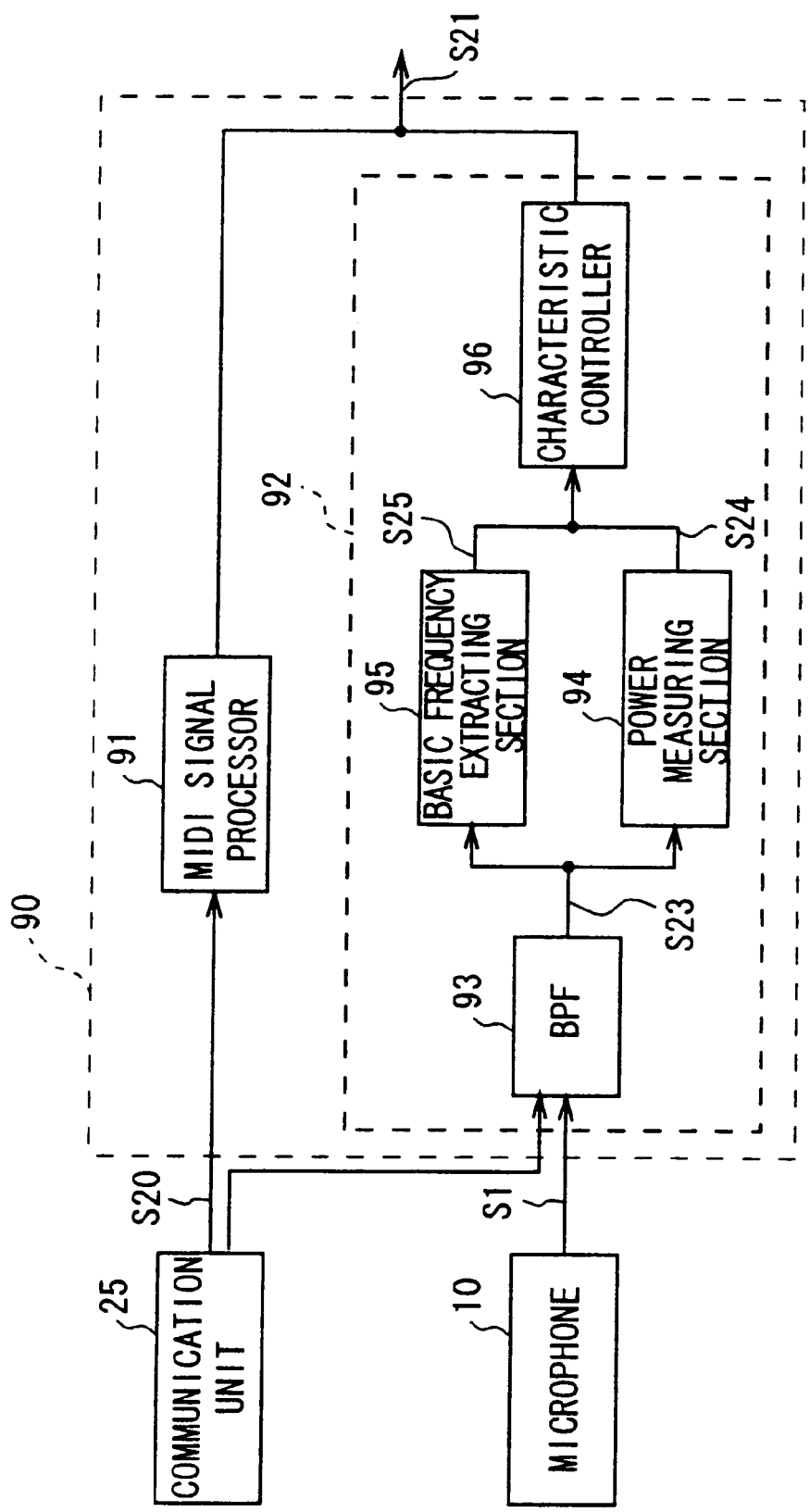
FIG. 26 is a block diagram showing the structure of a synchronized-signal generator.

In this robot 1, a synchronized signal producing part 90 as shown in FIG. 26 is provided in the sound processor 21, as a method of making the robot 1 dance based on the music gathered by the microphone 10, the music characteristics of music transmitted through the telephone line, and the music characteristics included in MIDI signals supplied through the telephone line 44 from the outside.

The synchronized signal producing part 90 inputs a MIDI signal S20 supplied from the outside via the communication unit 25 to a MIDI signal processor 91. The MIDI signal processor 91 extracts the music characteristics such as the rhythm, the interval and the strength of sounds, which are previously determined, from the supplied MIDI signal S20 and moreover, produces the synchronized signal S21 based on the extracted music characteristics, and outputs this to the controller 20.

The synchronized signal processing part 90 inputs the gathered sound signal S1 supplied from the microphone 10 and the music information supplied from the communication unit 25 to a non-MIDI signal processor 91. In this case, the non-MIDI signal processor 91 selects a signal processing mode from three signal processing modes by the outside manipulation.

When the first signal processing mode is selected, for example, the gathered signal S1 from the microphone 10 or the music information from the communication unit 25 is supplied to a band pass filter 93 which is composed of a variable band pass filter circuit or plural band pass filter circuits. The band pass filter 93 extracts the component of signals having a predetermined frequency bandwidth, which is included in the gathered signal S1 or the music information. As a result, the signal component, for example, of a predetermined musical instrument (for example, a drum) continuously played is extracted and supplied to a power measuring section 94 as a filter processed signal S22.

The power measuring section 94 detects power (strength) of sounds based on the supplied filter processed signal every predetermined interval (for example, every 10 [ms]), and sequentially transmits the detection results to a characteristic controller 95 as a power detection signal S24.

The characteristic controller 95 detects a part (time) exceeding a predetermined set threshold value from the supplied power detection signal S24. In addition, the characteristic controller 95 measures the rhythm, the intervals and the strength of sounds on a time axis based on the detection result, and produces the aforementioned synchronized signal S21 based on the measurement result.

Then, in such the first signal processing mode, the synchronized signal S21 is produced to make a robot dance to the tempo and power, mainly of like a drum, and supplied to the controller 20.

On the other hand, in the case where the second signal processing mode is selected, the non-MIDI signal processor 92 supplies the gathered signal S2 from the microphone 10 or the music information from the communication unit 25 to the band pass filter 93, and the gathered signal S1 or the music information is subjected to filtering processing for all bandwidth there, and then, the obtained filtering processed signal S23 is supplied to a basic frequency extracting section 95.

The basic frequency extracting section 95 extracts a basic frequency from the supplied filtering processed signal S23, and the obtained basis frequency signal S25 is supplied to the characteristic controller 96. The characteristic controller 96 measures the supplied basis frequency signal S25 as the difference on the time axis, and produces the aforementioned synchronized signal S21 based on the specific different information.

Then, in such the second signal processing mode, such the synchronized signal S21 as to make a robot dance to melody of music played with plural music instruments is produced and supplied to the controller 20.

Otherwise, in the case where the third signal processing mode is selected, in the non-MIDI signal processor 92, the gathered signal S1 from the microphone 10 or the music information from the communication unit 25 is supplied to the band pass filter 93, and the component of signals having the specific frequency bandwidth, which is included in the gathered signal 1 or the music information, is extracted there similarly to the first signal processing mode. Then, the obtained filtering processed signal S23 is supplied to the power measuring section 94. As a result, similarly to the first signal processing mode, the power detection signal S24 based on the filtering processed signal S23 is generated at the power measuring section 94 and supplied to the characteristic controller 96.

In addition to this, the band pass filter 93 applies the filtering processing to all bandwidth of the gathered signal S1 or the music information, and transmits the obtained filtering processed signal S23 to the basic frequency extracting section 95, similarly to the second signal processing mode. As a result, similarly to the second signal processing mode, the basic frequency signal S25 based on the filtering processed signal S23 is produced at the basic frequency extracting section 95, and then supplied to the characteristic controller 96.

Then, the characteristic controller 96, based on the supplied power detection signal S24 and basic frequency signal S25, produces the synchronized signal S21 with the combination of processing in the first and second signal processing modes.

In actual, in the case where a drum which has few musical interval difference is the main musical instrument even the same music, the characteristic controller 96 produces the synchronized signal S21 based on the tempo and the strength of sound, similarly to the first signal processing mode. Further, in the case where a stringed instrument which gives silence sounds and has less difference of strength of sounds is the main musical instrument, the characteristic controller 96 produces the synchronized signal S21 based on the difference of the basis frequency, similarly to the second signal processing mode. Furthermore, in the case of the mixture of these, it performs a mutual correction with at least two characteristics to produce the synchronized signal S21.

In such the third signal processing mode, the synchronized signal S21 is produced with high accuracy by the mixture of good processing in the first and second processing mode and is supplied to the controller 20.

In this way, the synchronized signal producing part 90 produces the synchronized signal S21.

(5) Operation and Effect of this embodiment

In the aforementioned configuration, this robot 1 displays images based on image information on the image display 13 and gives sounds based on sound information from the speaker 11, which are supplied through the telephone line 44 from the outside, and at the same time, moves in accordance with conversations. Further, the robot 1 performs designated movements based on a movement request (a second or third code number) supplied from the outside through the telephone line 44.

Therefore, using this robot 1 enables the transmission of feelings via sounds and images and further, the transmission of feelings via the movements of the real robot 1, thereby making it possible to communication with reality as if a communicating party was in front of you. In addition, for example, by using this robot 1, it is possible for a family and a doctor to call the robot 1 shown in FIG. 1 to monitor children and elderly people via the image recognizing section 12 of the robot 1 and to smoothly communicate by talking via the robot 1 when the children and elderly people who need helpers are in a house.

Further, if nobody answers a phone call from the outside within a predetermined time, the robot 1 judges the user's condition based on the outputs of various sensors disposed in the house, and transmits a message based on the judgment to a communicating party. Therefore, by using this robot 1, it is possible to give a suitable message for an answering telephone to the communicating party without troublesome setting work.

Furthermore, the robot 1 recognizes which user a phone call is for, by a number display service or asking with sounds when receiving the phone call from the outside, and comes nearer to the user based on the recognition. Thus, using this robot 1 enables a user to talk to a communicating party on the phone even if the user is too busy to go and get a receiver.

Furthermore, this robot 1 turns ON/OFF the switches of the video tape recorder 51 and the television set 52, and the switches 53, 54 on the wall and floor in the house, based on a request given from the user through the telephone line 44. Therefore, by using this robot 1, it is possible to control electrical appliances and switches which can not be manipulated by the telephone operation.

Furthermore, this robot 1 always recognizes the condition of a house, and calls a user, police, fire department or the like if discovering abnormality. By using this robot 1, it is possible to secure security of a house.

Furthermore, this robot 1 regularly calls the maintenance center 60 to check its various functions or to download the latest programs. Therefore, this robot 1 enables a user to use it without considering its condition.

Furthermore, this robot 1 detects a user being the designation and comes nearer to him when receiving E-mail. Therefore, using the robot 1 enables the user to recognize the Email with ease.

Furthermore, this robot 1 always checks a designated user and calls another user or a hospital previously registered if discovering abnormality. Therefore, by using the robot 1, it is possible to handle with the case where a person who needs a helper is into trouble.

Furthermore, this robot 1 dance to rhythm based on music formed of sounds gathered from the outside and the MIDI signal S20 transmitted through the telephone line 44. Therefore, this robot 1 can improve its amusement.

Furthermore, this robot 1 controls another robot 1 while they communicate with each other. Therefore, this robot 1 can makes plural robots 1 work together.

According to the aforementioned configuration, the robot 1 displays and gives images and sounds based on image information and sound information supplied from the outside through the telephone line 44, moves in accordance with conversions, and performs designated movements based on a movement request given from the outside through the telephone line 44, thereby making it possible to transmit feelings via sounds and images and feelings via movements of the real robot 1 so as to communicate with reality. Thus, a robot with high usability can be realized.

In addition, the robot 1 has the telephone function, the answering telephone, the call connecting function, the remote control function, the security function, the automatically maintenance and version-up function, the E-mail management function, the helper-requiring-person monitoring function, the dancing function, and the inter-robot communicating function, thereby making it possible to make the robot perform helpful movements and action for the user. Thus, a robot with high usability can be realized.

(6) Other embodiments

Note that, in the aforementioned configuration, the case has been described, in which the appearance of the robot 1 is like a dog or cat so that a user can take to it similarly to real animals. However, the present invention is not limited thereto and other various kinds of appearances can be applied. In this case, plural rollers and wheels can be used in place of the plural legs 5A–5D as a moving means of the robot 1.

Further, in the aforementioned configuration, the case has been described, in which the robot 1 transmits and receives various kinds of information through the telephone line 44 to/from the outside. However, the present invention is not limited thereto and similar communication can be achieved through mobile telephone line, radio waves, a circuit for Internet, infrared signals, a LAN (Local Area Network), or the like.

Furthermore, in the aforementioned configuration, various requests can be input by manipulating the key input section 24 or manipulating the dial buttons of the outside device 50. However, the present invention is not limited thereto and, in place of or in addition to it, a request can be input by voices using a sound recognizing function of the controller 20 or a request can be input with a remote controller.

Furthermore, in the aforementioned configuration, as a method of manipulating an electric appliance in a house by the robot 1, the case has been described, in which the robot 1 moves up to the electric appliances to output an infrared signal IR2 or to physically manipulate switches. However, the present invention is not limited thereto and a LAN can be provided in the house and all electric appliances in the house can be connected to this LAN so that the robot 1 can manipulate a corresponding electric appliance through this LAN. Note that, in this case, the robot 1 and the LAN are connected to each other by radio, so that the robot 1 can move freely.

Furthermore, in the aforementioned configuration, in the case of receiving a phone call or E-mail from the outside, the robot 1 moves up to the user. However, the present invention is not limited thereto and the robot 1 can give different sounds depending on users or output the name of a corresponding user to inform who the phone call is for.

Furthermore, in the aforementioned configuration, the case has been described, where, in the case where connecting a phone call from the outside to a corresponding user, the robot 1 looks for the user. However, the present invention is not limited thereto and, in the case where users are almost at fixed places, the robot 1 can previously memorize the places of the users to move up to the place while confirming the posture and position using the output of the acceleration and angular velocity sensor 23 when receiving a phone call.

Furthermore, in the aforementioned configuration, the case of memorizing sounds and images as an answering telephone function has been described. However, the present invention is not limited thereto and, for example, text data can be also memorized. In addition, the maintenance center 60 can manage text data such as E-mail, and, under the control of the maintenance center 60, text such as E-mail can be written and read via the sound processor 21 of the robot 1.

Furthermore, in the aforementioned configuration, the case has been described, in which the robot 1 looks for a user while confirming users when receiving a phone call from the outside. However, the present invention is not limited thereto and the robot 1 can give sounds from the speaker 11 to call the corresponding user when receiving a phone call and can moves its body toward the direction of hearing a response, or can move toward the corresponding user who performs movements (for example, waving his hand).

Furthermore, in the aforementioned configuration, the case will be described, in which the robot 1 has a battery (a battery such as a primary battery, other than a repeatedly chargeable battery such as a lithium secondary battery) as a power source. However, the present invention is not limited thereto and an alternating power source for business can be used as a power source, for example.

Furthermore, in the aforementioned configuration, in the explanation of the remote control function, the case where the robot 1 is controlled by manipulating the dial buttons of the outside device has been described. The present invention, however, is not limited thereto and a user gives a request, for example, "right" or "left", with sounds while confirming the surrounding situations which are photographed by the image recognizing section 12 and are transmitted from the robot 1, and thereby the robot 1 can move in accordance with the request.

Furthermore, in the aforementioned configuration, the case has been described, in which the synchronized-signal generator 90 of the sound processor 21 is configured as shown in FIG. 26. However, the present invention is not limited thereto and for example, a judgment circuit is disposed at the input stage of the synchronized-signal generator 90 for judging whether an input signal is a MIDI signal and moreover, the synchronized-signal generator 90 can be configured so that the gathered signal S1 from the microphone 10, music information read out from a removable storage medium not shown, or music information such as MIDI signals are all supplied to this judgment circuit, MIDI signals are supplied to the MIDI signal processor 91 based on the judgment result of the judgment circuit, and non-MIDI signals are supplied to the BPF section 93.

Furthermore, in the aforementioned configuration, the answering telephone function is applied to the robot 1 having the configuration as shown in FIG. 1. However, the present invention is not limited thereto and it can be applied to an information processing system having other various kinds of configurations.

Furthermore, in the aforementioned configuration, the case has been described, in which a response message for answering telephone is produced by the sound processor 21. However, the present invention is not limited thereto and such a response message can be previously stored in a prescribed storage medium like a memory and a corresponding message can be read out according to the user's conditions and be transmitted to a communicating party.

Industrial Applicability

A robot and an information processing system can be applied to an amusement robot, a helper robot and so on.

What is claimed is:

1. A robot apparatus comprising receiving means for receiving an external communication signal;

first memory means for storing identification information of a plurality of persons;

imaging means for detecting images of surroundings of the robot;

a plurality of component units connected to said robot;

driving means for driving said plurality of component units;

second memory means for storing feeling information of each of said plurality of persons;

identifying means for identifying a sender and a receiver of a communication signal when said receiving means receives said external communication signal; and search means for searching for said receiver identified by said identifying means based on an output image from said imaging means and the identification information stored in the first memory means, wherein said robot moves to said receiver when said search means finds said receiver and notifies said receiver of a call with a performance using said plurality of component units in accordance with said feeling information of said sender.

2. The robot apparatus according to claim 1, wherein the receiving means comprises a telephone communicating means.

3. The robot apparatus according to claim 1, wherein the external communication signal is formed of an E-mail message.

4. The robot apparatus according to claim 1, wherein the performance is an emotional performance.

5. An automatically-moving robot, comprising:

memory means for storing information;

changing means for changing said information stored in said memory means; and communicating means for periodically communicating with an external information providing device, wherein said changing means updates the information based on request information from said external information providing device.

6. The robot according to claim 5, wherein said information is control information for said automatically-moving robot.

7. A robot comprising:

telephone communication means;

means for receiving respective outputs from a plurality of sensors mounted on one of a user and the surroundings of the user;

user's condition recognizing means for recognizing the user's condition based on a combination of said outputs of said plurality of sensors memory means for storing a plurality of response messages in accordance with the user's condition, wherein the robot provides a response message by reading a message from the memory means in accordance with the user's condition recognized by said user's condition recognizing means when a telephone call is not answered within a predetermined line.

8. The robot according to claim 7, wherein said user's condition recognizing means includes a table that indicates relations between each user's condition and said outputs from said plurality of sensors.

9. An information processing system comprising:

telephone communication means;

means for receiving respective outputs from a plurality of sensors that are mounted on one of a user and the user's surroundings;

user's condition recognizing means for recognizing conditions of said user based on a combination of the outputs from said plurality of sensors;

memory means for storing a plurality of response messages in accordance with said conditions of said user, wherein the information processing system provides a response message by reading a message from said memory means in accordance with the user's condition recognized by said user's condition recognizing means when a telephone call is not answered within a predetermined time.

10. A robot comprising:

sensor means for inputting information from a user;

a plurality of component units connected to the robot;

driving means for driving said plurality of component units;

output means for outputting predetermined information; and communicating means for communicating with another electronic device, wherein the robot provides a motion driving the plurality of component units when an input is not received from said user within a predetermined time, and after providing said motion, said communicating means transmits said predetermined information from said information outputting means to another electronic device when the input is still not received from the user within a predetermined time.

11. A robot comprising:

a movement part for producing movements;

a driving means for driving said movement part;

input means for inputting music information;

characteristic amount extracting means for extracting a characteristic amount of music based on said music information based on said music information input via said input means;

synchronized-signal generating means for generating a synchronized-signal based on said characteristic amount extracted by said characteristic amount extracting means; and control means for controlling said driving means based on said synchronized-signal.

* * * * *